United States Patent

Ohno et al.

[15] 3,655,992

[45] Apr. 11, 1972

[54] ELECTRIC CONTROLLER SYSTEMS WITH MANUAL AND AUTOMATIC MODE

[72] Inventors: Isamu Ohno, Tokyo; Akio Kobayashi, Tokyo; Akira Ohte, Tokyo; Minoru Tamuki, Kawasaki; Susmu Ohto, Tokyo, all of Japan

[73] Assignee: Yokogawa Electric Works, Ltd., Tokyo, Japan

[22] Filed: July 27, 1970

[21] Appl. No.: 58,477

[30] Foreign Application Priority Data

Aug. 6, 1969 Japan..............................62158

[52] U.S. Cl...........................................307/87; 318/591

[51] Int. Cl............................................... H01h 31/00

[58] Field of Search.................318/581, 591; 307/85, 86, 87, 112, 134, 135

[56] References Cited

UNITED STATES PATENTS

| | | | |
|---|---|---|---|
| 3,422,457 | 1/1969 | Koppel | 318/591 |
| 3,523,193 | 8/1970 | Hutcheon | 318/591 |
| 3,549,976 | 12/1970 | Bretagne | 318/591 |

*Primary Examiner*—Herman J. Hohauser
*Attorneys*—Chittick, Pfund, Birch, Samuels and Gauthier

[57] ABSTRACT

In an controller for effecting bumpless switching between the manual control operation and the automatic control operation there are provided an input impedance connected to receive a measured signal from a processing system, an operational amplifier to provide an output signal to a load, a transfer switch connected between the input impedance circuit and the operation amplifier, a feedback capacitor for the operational amplifier to store a voltage related to the output signal, and a manual setter including means to modify the voltage stored in the feedback capacitor by an external signal. During the automatic adjusting operation the transfer switch is operated to connect the input impedance circuit to the input terminal of the operational amplifier whereas during the control operation by the external signal the transfer switch is operated to disconnect the input impedance circuit from the operational amplifier thus modifying the voltage stored in the feedback capacitor by the signal supplied by the manual controller.

27 Claims, 28 Drawing Figures

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier : ATTY

INVENTORS

ISAMU OHNO
AKIO KOBAYASHI
BY AKIRA OHTE
MINORU TAMUKI
SUSUMU OHTA

Chittick, Pfund, Birch, Samuels & Gauthier: ATTYS

*INVENTORS*
ISAMU OHNO
AKIO KOBAYASHI
AKIRA OHTE
MINORU TAMUKI
SUSUMU OHTA

BY

Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier : ATTY

INVENTORS
ISAMU OHNO
AKIO KOBAYASHI
AKIRA OHTE
MINORU TAMUKI
SUSUMU OHTA

BY Chittick, Pfund, Birch, Samuels & Gauthier: ATTY

INVENTORS
ISAMU OHNO
AKIO KOBAYASHI
BY AKIRA OHTE
MINORU TAMUKI
SUSUMU OHTA

Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier: ATT

INVENTORS
ISAMU OHNO
AKIO KOBAYASHI
AKIRA OHTE
MINORU TAMUKI
SUSUMU OHTA
BY
Chittick, Pfund, Birch, Samuels & Gauthier: ATTY INVENTORS
ISAMU OHNO
AKIO KOBAYASHI
AKIRA OHTE
MINORU TAMUKI
SUSUMU OHTA
BY
Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier: ATT

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier: ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier; ATTY

INVENTORS
ISAMU OHNO
AKIO KOBAYASHI
AKIRA OHTE
MINORU TAMUKI
SUSUMU OHTA

BY

Chittick, Pfund, Birch, Samuels & Gauthier: ATTY

Patented April 11, 1972

3,655,992

17 Sheets-Sheet 17

INVENTORS

BY ISAMU OHNO
AKIO KOBAYASHI
AKIRA OHTE
MINORU TAMUKI
SUSUMU OHTA

Chittick, Pfund, Birch, Samuels & Gauthier, Att

ELECTRIC CONTROLLER SYSTEMS WITH MANUAL AND AUTOMATIC MODE

BACKGROUND OF THE INVENTION

This invention relates to a novel controller utilized to control such variables in industrial processing systems as the temperature, pressure flow quantity of fluids and the like, and more particularly to a novel controller capable of controlling automatically or non-automatically.

SUMMARY OF THE INVENTION

It is an object of this invention to provide a novel controller of simple construction capable of switching its operation from automatic to manual or vice versa without the necessity of performing an balancing operation and without the trouble of bumps.

Another object of this invention is to provide an improved controller which can back-up the operation of a digital controller adapted to control a direct processing system by means of a digital operating device and can switch its operation without bumps.

Further object of this invention is to provide an controller which can limit the magnitude of an output signal supplied to a load to a predetermined constant range and can be controlled manually when desired without the necessity of manipulating a transfer switch mechanism and the like.

Still further object of this invention is to provide a novel controlling device wherein a cascade setting controlling device is comprised by a primary controller and a secondary controller and bumpless switching can be provided between cascade setting wherein the output of the primary controller is utilized as the set value of the secondary controller, and a local setting wherein the output determined by manual operation is utilized as the set value of the secondary controller.

Yet another object of this invention is to provide a new and improved cascade set controlling device whose output signal does not change rapidly when a feed forward signal is applied while feedback control is being performed or when the feedback signal is removed while both feedback control and feed forward control are being performed.

Another object of this invention is to provide a novel controlling device capable of providing bumpless switching between two or more controllers for controlling the same operating end.

Further object of this invention is to provide a novel controlling device capable of providing bumpless switching between output signals of two or more controllers where either larger or smaller outputs from these controllers is selected to supply the same operating end.

According to a preferred embodiment of this invention there is provided a controller comprising an input impedance circuit having an input terminal and an output terminal, means to apply a signal related to a measured signal from a processing system, an operational amplifier to produce an output signal supplied to a load, a transfer switch connected between the output terminal of the input impedance circuit and the input terminal of the operation amplifier, a feedback circuit including a capacitor connected between input and output terminals of the operational amplifier to store voltage related to the output signal, and a manual setter including means to modify the voltage stored in the capacitor by an external signal, the arrangement being such that at the time of the automatic control operation the transfer switch is operated to connect the output terminal of the input impedance circuit to the input terminal of the operational amplifier whereas at the time of the control operation, the transfer switch is operated to disconnect the output terminal of the input impedance circuit from the input terminal of the operational amplifier, thus modifying the voltage stored in the capacitor in the feedback circuit by the signal supplied by the manual setter.

BRIEF DESCRIPTION OF THE DRAWINGS

Further objects and advantages of this invention will become apparent from the following detailed description taken in conjunction with the accompanying drawings, in which:

FIG. 8 is controlled manually by means of a upper and lower limiter circuit;

DESCRIPTION OF THE PREFERRED EMBODIMENTS

In the following description and claims the term "manual control" is used to mean not only a manual control with the hands of man but also an adjustment effected by an external signal from a digital computor and the like.

Figure 1:
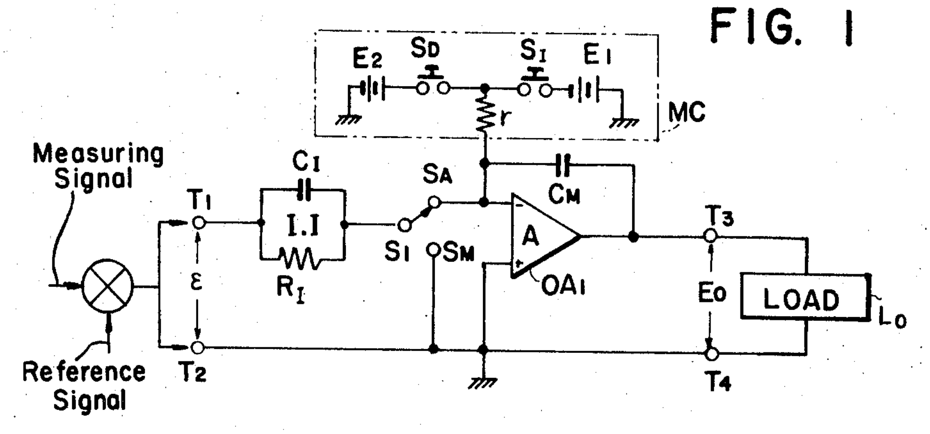
FIG. 1 shows an electric connection of a basic embodiment of the novel controlling device.

The embodiment of this invention shown in FIG. 1 comprises input terminals $T_1$ and $T_2$ to receive a signal $\epsilon$ related to the difference between a measured signal from a processing system and a set value or reference signal, an operational amplifier $OA_1$, a capacitor $C_I$ and a resistor $R_I$. Capacitor $C_I$ and resistor $R_I$ are connected in parallel to constitute an input impedance circuit I.I for an operational amplifier $OA_1$, whereas a feedback circuit thereof is comprised by a holding capacitor $C_M$. A transfer switch for switching the operation between a control by an external signal and an automatic control is connected between input impedance circuit I.I and operational amplifier $OA_1$. A manual setter MC is provided comprising manual switches $S_I$ and $S_D$ and sources $E_1$ and $E_2$ for manual controls. A load Lo is connected across output terminals $T_3$ and $T_4$ of operational amplifier $OA_1$.

To provide the automatic control, transfer switch $S_I$ is thrown to a contact $S_A$ whereby signal $\epsilon$ related to the deviation signal is applied to the input terminal of the operational amplifier $OA_1$ via input impedance circuit I.I. The operational amplifier operates to amplify this input signal to supply its output signal to load Lo. The output voltage Eo appearing across load Lo is fed back to the input side of the operational amplifier $OA_1$ via capacitor $C_M$ so that operational amplifier $OA_1$ operates to reduce its input to zero. As a result, capacitor $C_M$ stores a voltage corresponding to output voltage Eo across load Lo. When the gain of the operational amplifier $OA_1$ is made sufficiently large there is hold a relation expressed by equation (1) between diviation signal $\epsilon$ and the load voltage Eo $$Eo=\epsilon\cdot\frac{C_I}{C_M}\left(1+\frac{1}{R_IC_IS}\right)$$
$$=\epsilon\cdot Kp\cdot\left(1+\frac{1}{T_I\cdot S}\right) \quad (1)$$

where $S:\frac{d}{dt}$ $Kp: C_I/C_M$ $T_I: R_I\cdot C_I$

As can be noted from equation (1), the device shown in FIG. 1 functions as an control which provides proportionality and integrating operations whose proportionality gain Kp is determined by CI/CM and integrating time $T_I$ by $R_I\cdot C_I$.

To provide the manual control, transfer switch $S_1$ is thrown to contact $S_M$. Then one terminal of input impedance circuit I.I. is disconnected from the input terminal of operational amplifier $OA_1$ and connected to a point of common potential (shown as the ground) via transfer switch $S_1$. The circuit comprising operational amplifier $OA_1$ and capacitor $C_M$ operates as a holding amplifier to provide an output determined by the voltage stored in capacitor $C_M$. For this reason transfer from the automatic control to the manual control does not vary the output voltage Eo. Thus, it is possible to provide a bumpless switching from the automatic control to the manual control without the necessity of performing a balancing operation. After switching to the manual control condition in this manner, either one of manual control switches $S_I$ or $S_D$ is operated to apply to operational amplifier $OA_1$ a positive or negative voltage from positive source $E_1$ or negative source $E_2$ via a resistor $r$ to vary the charging voltage of capacitor $C_M$ thus performing the manual control. More particularly, when manual control switch $S_I$ is closed, the output voltage Eo will increase with a time constant determined by the value of resistor $r$ and the capacitance of capacitor $C_M$. Whereas when manual control switch $S_D$ is closed the output voltage Eo will decrease with the same time constant as above described. When neither of manual control switches $S_1$ or $S_D$ is closed, the charge of capacitor $C_M$ will be held so that the output voltage Eo is maintained at a definite value. Under these manual control conditions, since one terminal of the input impedance circuit I.I is grounded through manual-automatic transfer switch $S_1$, this grounded terminal will always be maintained at the zero potential irrespective of the value of the signal $\epsilon$ related to the deviation signal. For this reason, transfer of the transfer switch $S_1$ from contact $S_M$ to contact $S_A$ to switch the condition from manual to automatic control does not cause rapid change in the output voltage Eo. Thus, it is possible to provide bumpless switching between the manual control condition and the automatic control condition without the necessity of performing a balancing operation regardless of the value of signal $\epsilon$ related to the deviation signal.

In this manner, the novel control enables bumpless switching between automatic control and manual control effected by an external signal without performing a belancing operation.

Figure 2:
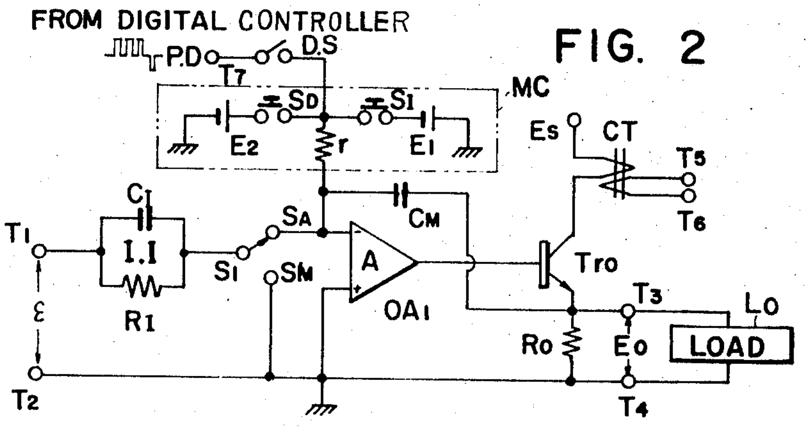
FIG. 2 shows as connection diagram of a modified embodiment of this invention.

FIG. 2 shows a modified embodiment of this invention wherein a signal $\epsilon$ impressed across input terminals $T_1$ and $T_2$ is impressed upon one input terminal of an operational amplifier $OA_1$ via an input impedance circuit I.I comprising a parallel combination of a capacitor $C_I$ and a resistor $R_I$ and a manual-automatic transfer switch $S_1$ under the automatic adjustment condition. An output transistor TrO amplifies further the output signal from operational amplifier $OA_1$ to apply an output voltage Eo across output terminals $T_3$ and $T_4$. The transistor also generates a current output across terminals $T_5$ and $T_6$ via current transformer CT. Output voltage Eo is fed back to the input terminal of operational amplifier $OA_1$ through capacitor $C_M$ which stores a voltage corresponding to the output voltage Eo. The output signal from the manual setter MC is applied to the input terminal of operational amplifier $OA_1$ through resistor $r$. A signal $P_D$, consisting of a train of positive or negative pulses, for example, is impressed upon a terminal $T_7$ from a digital controller, not shown, and this pulse train signal $P_D$ is applied to the input terminal of the operational amplifier $OA_1$ through resistor $r$.

The automatic and manual control operations of the embodiment shown in FIG. 2 are accomplished in the same manner as in the embodiment shown in FIG. 1. In this modification, however, to provide a back-up operation of the digital controller, the manual-automatic transfer switch $S_1$ is thrown to contact $S_M$ and the back-up switch DS is closed. These switches may be comprised by transistor switching elements or relays operated synchroneously with the fault of the digital controller. Thus the pulse train signal $P_D$ from the digital controller is impressed upon the input terminal of operational amplifier $OA_1$ through resistor r. More particularly, as a result of application of the positive or negative pulse train signal $P_D$ upon the input terminal of operational amplifier $OA_1$, the circuit comprising this amplifier and capacitor $C_M$ acts as a holding circuit of the integrating type to provide an analogue output voltage Eo corresponding to the pulse train signal from the digital controller across output terminals $T_3$ and $T_4$.

At the time of the back-up operation of the digital controller, since one terminal of input impedance circuit I.I is grounded in the same manner as the manual control operation, this grounded terminal is always maintained at zero potential irrespective of the value of signal $\epsilon$ impressed upon input terminals $T_1$ and $T_2$. For this reason, even when the operation is switched from digital to automatic control by transferring transfer switch $S_1$ from contact $S_M$ to contact $S_A$, the output voltage will not be varied rapidly, thus assuring bumpless switching.

Figure 3:
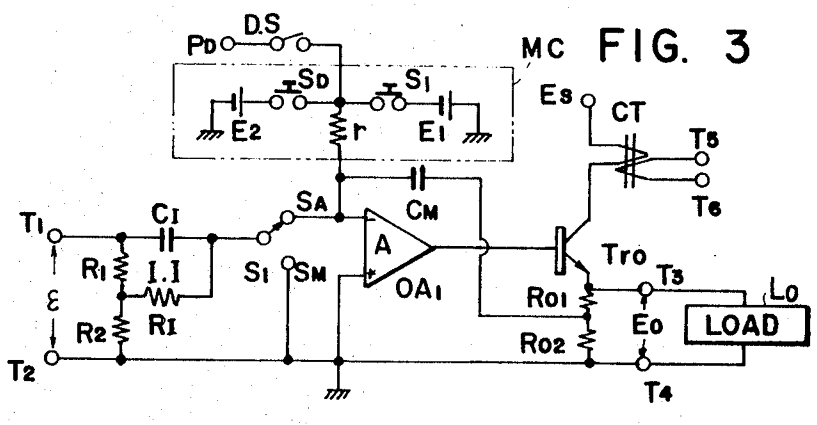
FIG. 3 shows a modification of the embodiment shown in FIG. 2 according to which the integration time and proportionality gain are multiplied by factors $n_1$ and $n_2$ respectively.

FIG. 3 shows a modification of FIG. 2 wherein the integrating time and the proportionality gain are multiplied by factors $n_1$ and $n_2$, respectively. For this purpose a potentiometer circuit comprising resistors $R_1$ and $R_2$ is connected across input terminals $T_1$ and $T_2$ and the juncture between resistors $R_1$ and $R_2$ is connected to one terminal of a resistor $R_I$. As a result of this connection a voltage $n_1$ times $$\left(n_1=\frac{R_2}{R_1+R_2}\right)$$

of the signal $\epsilon$ impressed across input terminal $T_1$ and $T_2$ is applied to the input terminal of operational amplifier $OA_1$ via resistor $R_I$.

Further, a potentiometer circuit comprising resistors $R_{01}$ and $R_{02}$ is connected across output terminals $T_3$ and $T_4$ and the junction between resistors $R_{01}$ and $R_{02}$ is connected to the input terminal of operational amplifier $OA_1$ through capacitor $C_M$. With this connection $1/n_2$ times $$\left(n_2=\frac{R_{O2}}{R_{O1}+R_{O2}}\right)$$

of the output voltage $Eo$ produced across output terminals $T_3$ and $T_4$ is fed back to the input terminal of the operational amplifier $OA_1$ through capacitor $C_M$. With this embodiment it is possible to vary the integrating time at the time of the automatic control by varying the ratio of voltage division $n_1$ of the potentiometer circuit comprised by resistors $R_1$ and $R_2$ and to vary the proportionality gain by varying the ratio of voltage devision $n_2$ of the potentiometer circuit comprised by resistors $R_{01}$ and $R_{02}$.

Figure 4:
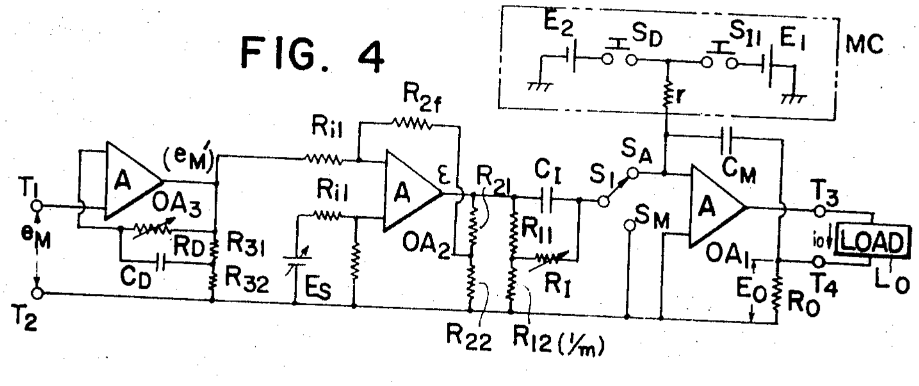
FIGS. 4 to 7 show connection diagrams of other embodiments of this invention.

In a modified embodiment shown in FIG. 4, there is provided a so-called differentiated anticipatory proportional, integrating and differentiating controller wherein a measured signal from the processing system is first differentiated, and then the difference signal between the differentiated signal and a reference signal is subjected to proportional and integration operations. In the embodiment, shown in FIG. 5 a measured signal $e_M$ impressed across input terminal from the processing system is differentiated by a differential input operational amplifier $OA_3$ provided with a feedback circuit including a capacitor $C_D$ and a resistor $R_D$ and the differentiated measured signal $e_M'$ is applied to one input terminal of an operational amplifier $OA_2$ through a resistor $Ri_1$ while a reference signal $E_S$ is applied to the other input terminal of the operational amplifier $OA_2$ through a resistor $Ri_1$. Consequently an output signal $\epsilon$ corresponding to the difference of the differentiated measured signal $e_M'$ and the reference signal $E_S$ is provided at the output terminal of operational amplifier $OA_2$. A fraction of the output voltage of the operational amplifier derived from a potentioner consisting of resistors $R_{21}$ and $R_{22}$ is fed back to the input terminal of operational amplifier $OA_2$. Output signal $\epsilon$ from operational amplifier $OA_2$ is impressed upon the input terminal of operational amplifier $OA_1$ through input impedance circuit I.I during the automatic control operation or when manual-automatic transfer switch $S_1$ is thrown to contact $S_A$. Whereas during the manual control operation, that is when manual-automatic transfer switch $S_1$ is thrown to contact $S_M$ the output signal-$\epsilon$ from operational amplifier $OA_2$ is coupled to the point of common potential or the ground. Capacitor $C_M$ stores a voltage corresponding to the output current flowing through load Lo. With this connection the relation between output voltage $Eo$ produced across resistor Ro and the measured signal $e_M$ of the processing system is expressed by the following equation (2).

$$Eo=\left\{\frac{1+R_DC_DS}{1+\frac{R_{32}}{R_{31}+R_{32}}R_DC_DS}\cdot e_M-E_S\right\}\frac{R_2f}{Ri_1}\cdot\frac{R_{21}+R_{22}}{R_{22}}\cdot\frac{C_1}{C_M}\left(1+\frac{1}{\frac{R_{11}+R_{12}}{R_{12}}C_I\cdot R_I\cdot S}\right)=\left\{\frac{1+R_DC_DS}{1+\frac{1}{n}R_DC_DS}e_M-E_S\right\}\frac{R_2f}{Ri}\cdot\alpha\frac{C_I}{C_M}\left(1+\frac{1}{mC_IR_IS}\right) \quad (2)$$

where $S:\frac{d}{dt}$ $\frac{1}{n}:\frac{R_{32}}{R_{31}+R_{32}}$ $\alpha:\frac{R_{21}+R_{22}}{R_{22}}$ and $m:\frac{R_{11}+R_{12}}{R_{11}}$ As equation 2 clearly shows various constants of this modified embodiments are:

| | |
|---|---|
| proportionality gain | $K_p=\alpha(R_2f)/(Ri_1)\cdot(C_I)/(C_M)$ |
| integration time | $T_I=m\cdot C_I\cdot R_I$ |
| integration gain | $K_I=A_1(C_M)/(mC_I)$ ($A_1$: gain of $OA_1$) |
| differentiation time (measured signal alone) | $T_D=R_D\cdot C_D$ |
| differentiated gain | $K_p=n$ |

Again the manual control and automatic control operations are performed in the same manner as those of the embodiment shown in FIG. 1.

Figure 5:
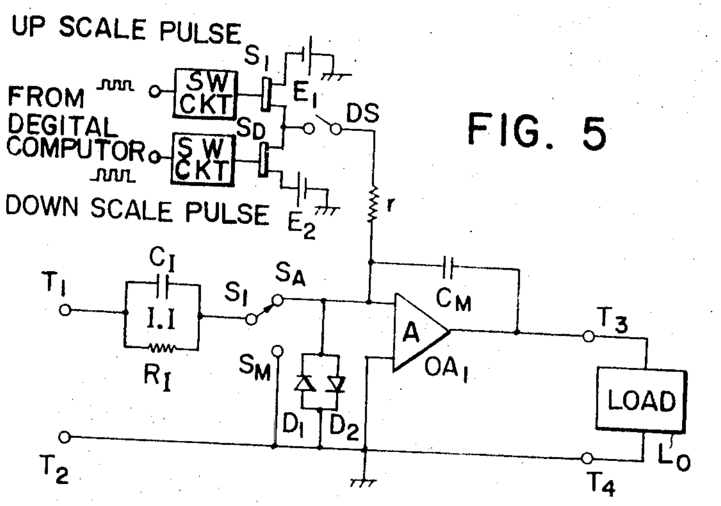

FIG. 5 shows still further modification of this invention which is similar to that shown in FIG. 1 except that a pair of diodes connected in parallel position is connected across the input terminal of the operational amplifier $OA_1$ and the ground. Provision of the diode circuit across the input terminal of the operational amplifier $OA_1$ and the ground can assure normal operation of the operational amplifier even when the output thereof becomes saturated. In this embodiment, the manual setter MC can be driven by an external signal from a digital computer or the like when switches $S_I$ and $S_D$ of the manual setter MC are comprised by field effect transistor elements and by applying to these elements an upscale pulse or a down scale pulse from a digital computor, for example.

Figure 6:
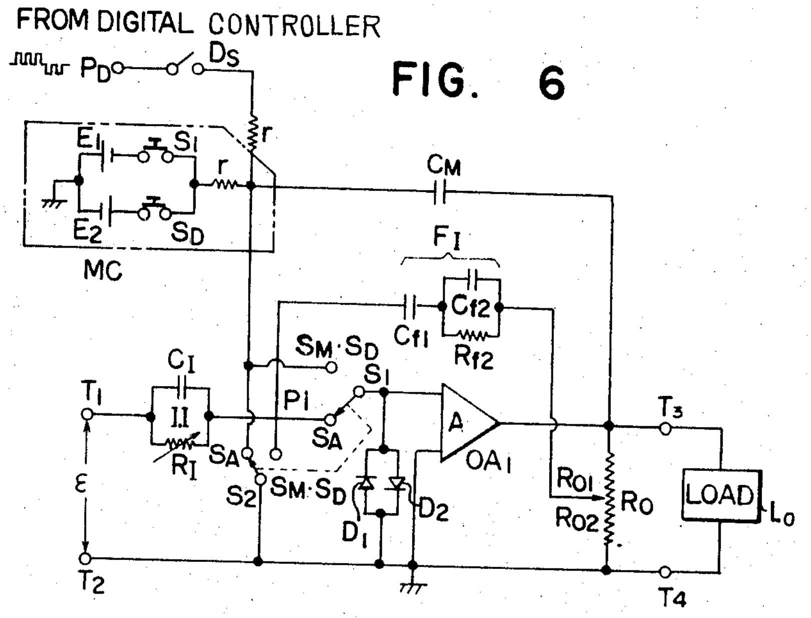

Still further embodiment shown in FIG. 6 comprises an operational amplifier $OA_1$, an input impedance circuit I.I including a capacitor $C_I$ and a variable resistor $R_I$, a feedback circuit for operational amplifier $OA_1$ comprised by capacitors $Cf_1$ and $Cf_2$ and a resistor $Rf_2$, potentiometer Ro comprised by resistors $R_{01}$ and $R_{02}$, a holding capacitor $C_M$ to store a voltage corresponding to output voltage Eo, and a manual-automatic transfer switch including interlocked movable contacts $S_1$ and $S_2$ stationary contacts $S_M.S_D$ engageable by movable contact $S_1$ and $S_2$ at the time of the manual control or during back-up operation of a digital controller, not shown, and contacts $S_A$ engageable by the movable contact at the time of the automatic control. These are also provided a manual setter MC comprising manual switches $S_I$ and $S_D$ and sources $E_1$ and $E_2$.

In this embodiment, to provide the automatic control, manual-automatic transfer switches $S_1$ and $S_2$ are thrown to contacts $S_A$. Then the juncture Pi between input impedance circuit I.I and feedback circuit $F_I$ is connected to the input terminal of operational amplifier $OA_1$ via switch $S_1$, whereas one terminal of capacitor $C_M$ is grounded through switch $S_2$. Then the relationship between signal $\epsilon$ impressed across input terminals $T_1$ and $T_2$ and output voltage $E_o$ appearing across output terminals $T_3$ and $T_4$ can be expressed by following equation (3) provided that the gain of operational amplifier $OA_1$ is sufficiently high.

$$Eo=\epsilon\cdot-\frac{C_I}{Cf_1}\cdot\frac{R_{O1}+R_{O2}}{R_{O2}}\left(1+\frac{1}{C_IR_IS}\right)\left\{\frac{1+Rf_2(Cf_1+Cf_2)S}{1+Rf_2Cf_2S}\right\}$$

$$=\epsilon\cdot Kp\left(1+\frac{1}{T_I\cdot S}\right)\left\{\frac{1+T_{D2}\cdot S}{1+T_{D1}\cdot S}\right\} \quad (3)$$

where $Kp:\frac{C_I}{Cf_1}\cdot\frac{R_{O1}+R_{O2}}{R_{O2}}=\frac{C_I}{Cf_1}\cdot\alpha$ $T_I:C_IR_I$ $T_{D1}:Rf_2\cdot Cf_2$ and $T_{D2}:Rf_2(Cf_1+Cf_2)$ As can be clearly noted from equation (3) this embodiment provides a proportional, integrating and differentiating control whose proportionality constant Kp is determined by $C_I/Cf_1.\ \alpha$, integrating constant $T_I$ by $C_IR_I$, and the differentiating constants $T_{D1}$ and $T_{D2}$ by $Rf_2.Cf_2$ and $Rf_2(Cf_1+Cf_2)$, respectively. During the automatic control operation capacitor $C_M$ stores the output voltage $E_o$.

Upon establishment of the manual control condition by throwing manual-automatic transfer switches to their contacts $S_M$, the juncture $P_I$ between input impedance circuit I.I and feedback circuit $F_I$ is disconnected from the input terminal to operational amplifier $OA_1$ and grounded through switch $S_2$ while at the same time one terminal of capacitor $C_M$ is connected to the input terminal of the operational amplifier $OA_1$. As a result, the voltage stored in condenser $C_M$ appears across output terminals of operational amplifier $OA_1$. In this manner switching from the manual control operation to the automatic control operation does not cause any appreciable variation in the output voltage, thus assuring bumpless switching.

To provide the manual control operation, manual switch $S_I$ or $S_D$ in the manual setter MC is suitably closed to supply a different charging voltage to capacitor $C_M$ from positive source $E_1$ or negative source $E_2$. Denoting the closed period of manual switch $S_I$ or $S_D$ by $\Delta t$, the change $\Delta E$ in the output voltage $\Delta E$ can be shown by equation (4).

$$\Delta E = -V_M/C_M . r\ \Delta t \qquad (4)$$

where $V_M$ represents the voltages of the sources $E_1$ and $E_2$.

Under these manual control conditions the juncture $P_i$ between input impedance circuit I.I and feedback circuit $F_l$ is grounded through switch $S_2$. Accordingly this juncture is maintained at the zero potential to store signal $\epsilon$ impressed across input terminals $T_1$ and $T_2$ in capacitor $C_l$ of the input impedance circuit I.I and a fraction of output voltage $E_o$ derived from potentiometer resistors $R_{01}$ and $R_{02}$ in capacitor $Cf_1$ of the feedback circuit $F_l$. For this reason, transfer of manual-automatic transfer switches $S_1$ and $S_2$ from contacts $S_M$ to contacts $S_A$ for switching the operation from the manual control to the automatic control does not cause rapid variation in the output voltage thus assuring bumpless switching.

Figure 7:
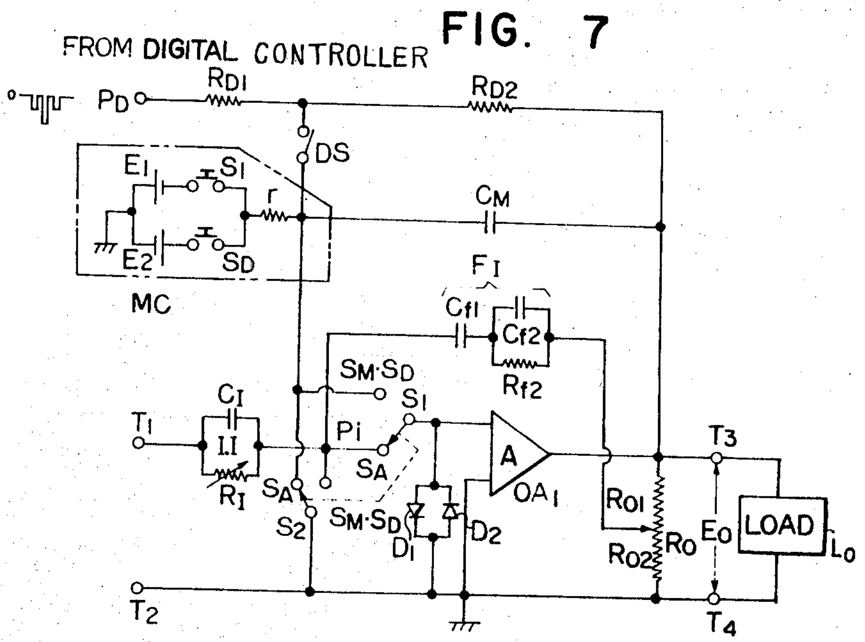

To utilize the circuit shown in FIG. 6 as the output device of the digital controller, not shown, for the purpose of backing-up the same, manual-automatic transfer switches $S_1$ and $S_2$ are thrown to their contacts $S_D$ and a positive or negative pulse train signal $P_D$ from the digital adjusted is impressed upon the input terminal of operational amplifier $OA_1$. More particularly, the positive-negative pulse train signal $P_D$ or a positive or negative pulse signal is impressed upon the input terminal of operational amplifier via resistor $r$ thus causing the circuit including operational amplifier $OA_1$ and capacitor $C_M$ to operate as a integrating type holding circuit. In the case, where the signal from the digital control is an absolute value pulse signal or an analogue signal a resistor $R_{D2}$ is connected in parallel with capacitor $C_M$ to apply the signal from the digital controller to the input terminal of operational amplifier $OA_1$ via resistor $R_{D1}$ thus causing the circuit including operational amplifier $OA_1$ and capacitor $C_M$ to act as a holding circuit as shown in FIG. 7.

In this manner, when the circuit is operating to back-up the digital control just in the same manner as in the manual control operation, the juncture Pi between input impedance circuit I.I and feedback circuit is grounded so that this juncture Pi is always maintained at the zero potential irrespective of the value of the signal $\epsilon$ impressed across input terminals. Consequently, the switching operation from the back-up operation of the digital adjuster to the automatic control operation caused by the signal from the digital control can be effected without a bump.

Figure 8:
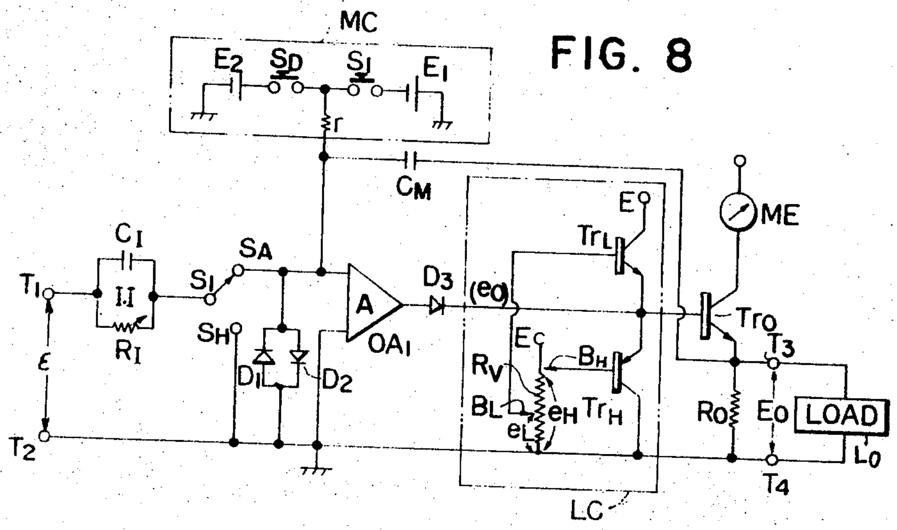
FIG. 8 shows still another embodiment of this invention wherein a limiter circuit for upper and lower limits is connected to the output side of an controller.

In another embodiment of this invention shown in FIG. 8, the output from operational amplifier $OA_1$ is applied to the base electrode of an output transistor $T_{ro}$ via a diode $D_3$ to obtain an output voltage $E_o$ across a resistor $R_o$ connected between the emitter electrode of the output transistor $T_{ro}$ and the ground. An indicating meter ME is connected to the collector electrode to indicate the output voltage supplied to load $L_o$.

Figure 9A:
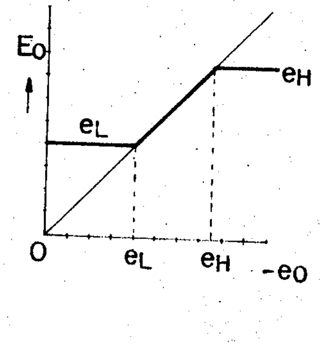
FIG. 9A shows a limiter characteristic of a upper and lower limiter circuit having a configuration as shown in FIG. 9B.
Figure 9B:
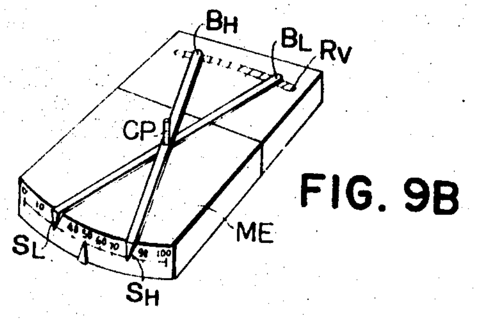

Between operational amplifier $OA_1$ and output transistor $T_{ro}$ is connected a limiter circuit LC for upper and lower limits comprising a pair of transistors $T_{rL}$ and $T_{rH}$ and a variable resistor $R_V$ provided with two sliding brushes $B_H$ and $B_L$. The limiter circuit being constructed such that transistor $T_{rL}$ becomes ON when the output voltage of operational amplifier $OA_1$ becomes smaller than a lower limit voltage $e_L$ established by brush $B_L$ whereas transistor $T_{rH}$ becomes ON when the output voltage of the operational amplifier $OA_1$ becomes larger than the upper limit voltage $e_H$ established by brush $B_H$. As a result the operating characteristics of limiter circuit LC is shown by the graph of FIG. 9A, which shows that the output voltage $E_o$ varies linearly in the range between the lower set voltage $e_L$ and the upper set voltage $e_H$ of the output voltage $e_0$ from the operational amplifier $OA_1$. The limiter circuit LC has an appearance as shown in FIG. 9B. Thus, set arms or reference markings $S_H$ and $S_L$ for upper and lower limits and respectively connected to brushes $B_H$ and $B_L$ are pivotally mounted on a shaft to cooperate with the dial of indicating meter ME. Upper and lower limit voltages $V_H$ and $V_L$ can be varied by adjusting the position of these arms $S_H$ and $S_L$.

Provision of such a limiter circuit LC enables to maintain the output voltage $E_o$ always in a constant range even when the output voltage $e_0$ of operational amplifier $OA_1$ deviates from said range. In an arrangement where the voltage stored in capacitor $C_M$ is held to provide the output under the manual control condition as shown in FIG. 1 the voltage of capacitor $C_M$ tends to gradually decrease due to leakage so that such arrangement can not provide the manual control operation over a long period of time. Whereas, where limiter circuit LC is incorporated as in the embodiment shown in FIG. 8 the output voltage $E_o$ will never become lesser than the lower limit value $e_L$, thus enabling manual control over a long period of time.

Figure 10A:
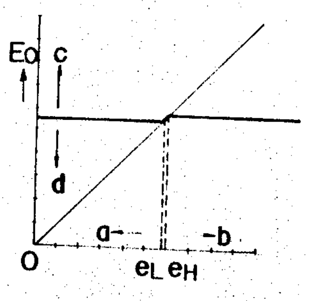
FIG. 10A shows an input-output characteristic when the controlling device shown is
Figure 10B:
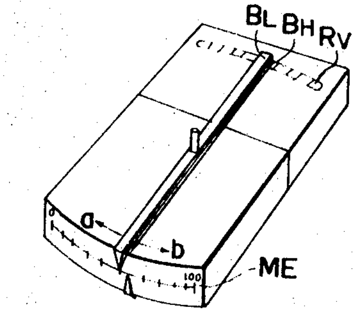
FIG. 10B shows a perspective view of a upper and lower limiter circuit that exhibits the characteristic shown in FIG. 10A.

Further, in this embodiment, by selecting substantially the same values for the upper and lower limit set voltage $e_H$ and $e_L$ and by making both of them variable, the output voltage $E_o$ can be varied accordingly. More particularly, when the upper and lower limit set voltage $e_H$ and $e_L$ are selected to be substantially the same, the operating characteristics of the limiter circuit LC will become to that shown in FIG. 10A so that by simultaneously varying the upper and lower limit set voltage $e_H$ and $e_L$ in the direction of arrow $a$ or $b$, the output voltage $E_o$ is also varied in the direction of arrow $c$ or $d$. Accordingly, as shown in FIG. 10 by aligning set markings $S_H$ and $S_L$ for upper and lower limits and by adjusting them in unison while observing the indication of the indicating meter ME, manual control can also be made. Under such manual control condition wherein the upper and lower limit voltage $e_H$ and $e_L$ are varied in unison, since capacitor $C_M$ stores the voltage corresponding to the output voltage $E_o$ applied to load $L_o$ it is possible to transfer the operation from the manual control to the automatic control without bumps.

Figure 11:
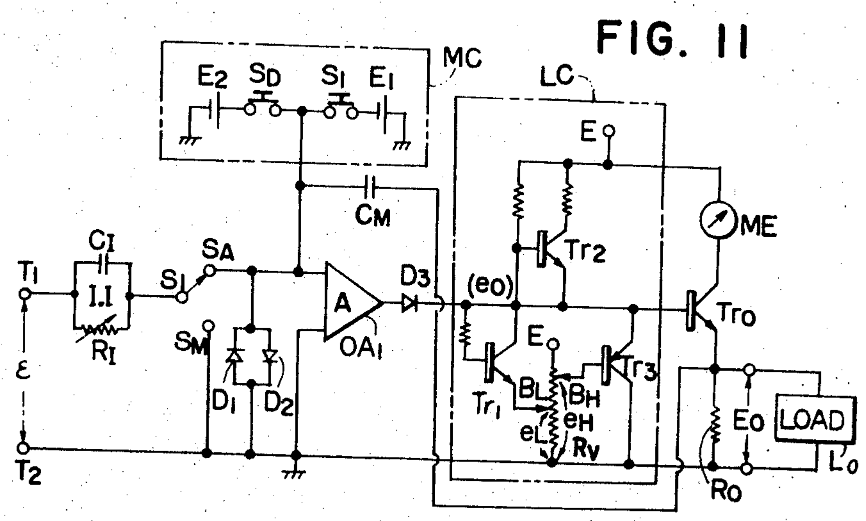
FIGS. 11 and 12 are connection diagrams similar to FIG. 8 but with modified upper-lower limiter circuits.
Figure 12:
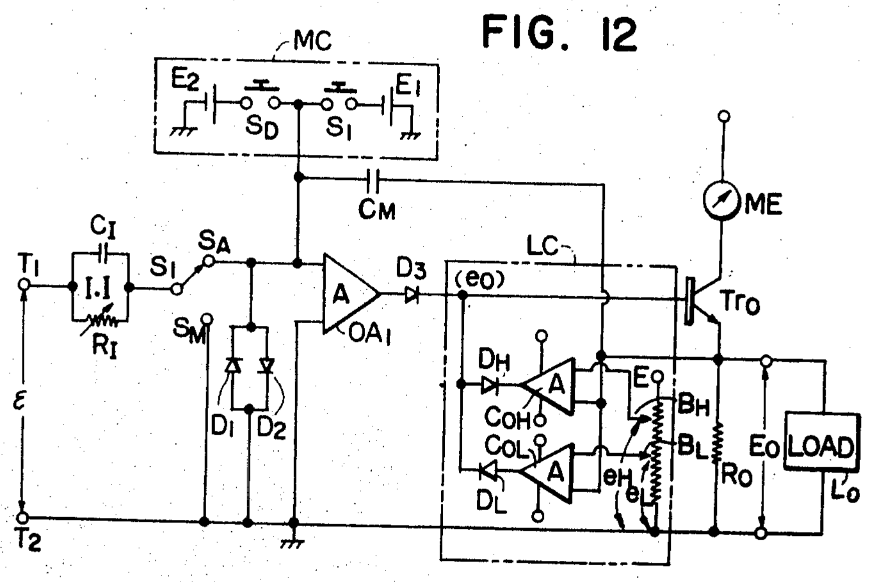

FIGS. 11 and 12 show connection diagrams of still further embodiments of this invention utilizing different limiter circuits LC from that shown in FIG. 8.

The limiter circuit LC shown in FIG. 11 comprises three transistors $T_{r1}$, $T_{r2}$ and $T_{r3}$, and a variable resistor $R_V$ including two brushes $B_H$ and $B_L$. In this embodiment, when output voltage $e_0$ from operational amplifier $OA_1$ becomes less than the lower limit set voltage $e_L$ established by brush $B_L$ transistor $T_{r1}$ is rendered OFF to increase the base potential of transistor $T_{r2}$ thus rendering conductive transistor $T_{r2}$. On the other hand, when output voltage $e_0$ of operational amplifier $OA_1$ increases beyond the upper limit set voltage $E_H$ established by brush $B_H$ transistor $T_{r3}$ is rendered conductive. In this manner, the output voltage $E_o$ is maintained in a definite range defined by upper and lower limit set voltage $e_H$ and $e_L$.

The limiter circuit LC shown in FIG. 12 comprises a variable resistor $R_V$ having two brushes $B_H$ AND $B_L$, a first comparator $Co_H$ for comparing the output voltage $E_o$ with voltage $e_H$ established by brush $B_H$ and a second comparator $Co_L$ for comparing output voltage $E_o$ with voltage $e_L$ established by brush $B_L$ and diodes $D_H$ and $D_L$ which are controlled to their ON and OFF states by the outputs from comparators $Co_H$ and $Co_L$. When output voltage $e_0$ from operational amplifier $OA_1$ becomes less than the lower limit set voltage $e_L$, comparator $Co_L$ causes diode $D_L$ to become ON. On the other hand, when output voltage $e_0$ from operational amplifier $e_0$ becomes larger than the upper limit set voltage $e_H$ comparator $Co_H$ causes diode DH to become ON. In this manner, output voltage $E_o$ is maintained in a safe range defined by upper and lower limit set voltages $e_H$ and $e_L$.

Figure 13:
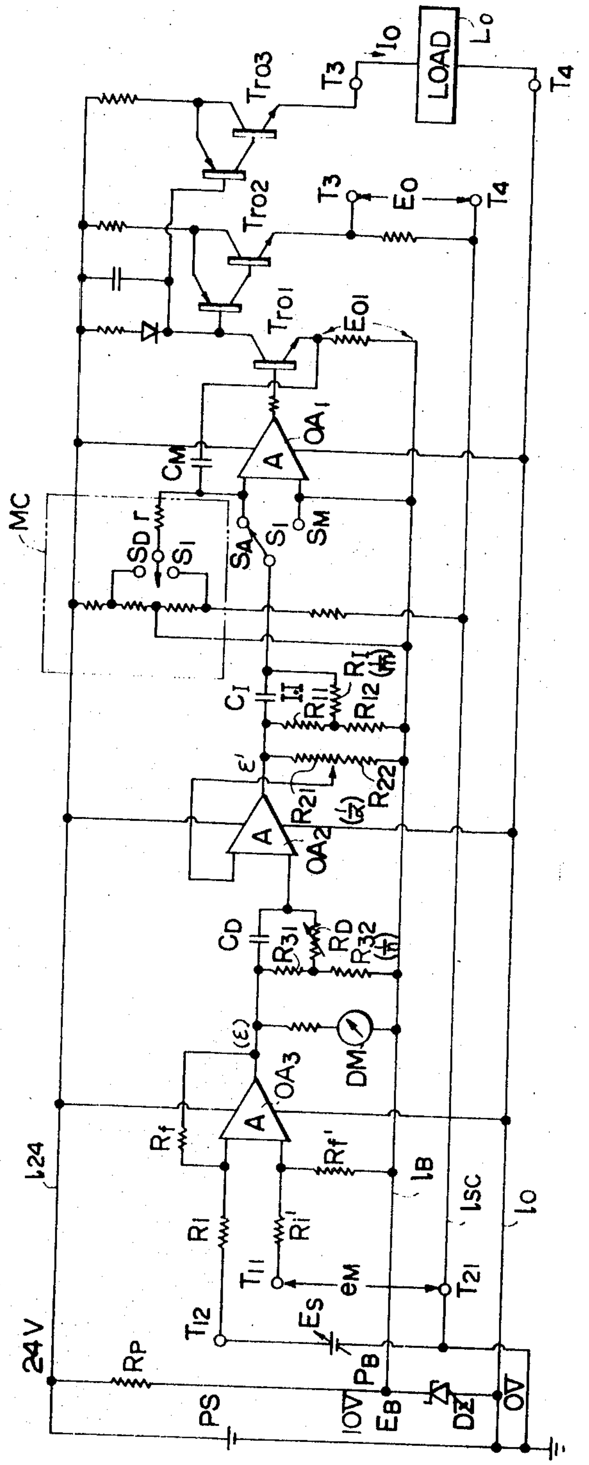
FIG. 13 shows an electrical connection of another embodiment of this invention including a source circuit.

FIG. 13 shows a connection diagram of another embodiment of the novel control including the source circuit. Where an operational amplifier is comprised by a linear integrated circuit and the like, although it is usual to provide positive and negative sources of supply to operate the amplifier, this embodiment utilizes a single DC source. In this embodiment, a power source PS supplying DC 24 volts is connected to serially connected resistor $R_p$ and Zenor diode $D_Z$ to produce a bias voltage $E_B = 10$ volts at the juncture between resistor $R_p$ and Zenor diode $D_Z$. Source terminals of operational amplifiers $OA_1$, $OA_2$ and $OA_3$ are respectively connected to a zero volt line $1_0$ and 24 volt line $1_{24}$ connected to power source PS. A measured signal $e_M$ from a processing system, not shown, is supplied across one input terminal $T_{11}$ of operational amplifier $OA_3$ and a common signal line $1_{SC}$ while a reference or set value signal $E_S$ across the other input terminal $T_{12}$ of operational amplifier $OA_3$ and common signal line $1_{SC}$. Thus, operational amplifier $OA_3$ functions to amplify the difference between measured signal $e_M$ from the processing system and reference signal $E_S$ to product at its output a deviation signal $\epsilon$ biased by bias voltage $E_B$ and expressed by an equation $\epsilon = E_B + R_f/R_i (e_M - E_S)$. Since the input voltage to the operational amplifier is expressed by $$\frac{e_M Rf' + E_B Ri'}{Ri' + Rf'},$$

by the suitable selection of values of bias voltage $E_B$, and resistors $R_i'$ and $R_f'$, operation of the operational amplifier $OA_3$ in the most suitable operational range can be assured. The deviation signal $\epsilon$ is subjected to proportional and differentiating operations by means of a circuit including resistor $R_D$ and capacitor $C_D$ and thence imparted with a proportionality gain by means of a circuit including resistors $R_{21}$ and $R_{22}$. Since these operations are performed by taking the bias line $1_B$ at the reference potential $E_B$ as the reference these operations are performed only for the term $R_f/R_i (e_M - E_S)$ of the deviation signal $\epsilon$ and not for the bias voltage $E_B$. Output signal from the operational amplifier is subjected to proportional and integrating operations by means of an input impedance circuit comprising capacitor $C_I$, resistor $R_I$ and resistors $R_{11}$ and $R_{12}$ and of a circuit including capacitor $C_M$ and operational amplifier $OA_1$ to obtain output voltage $E_{01}$. Since this output voltage $E_{01}$ utilizes the voltage of bias line $1_B$ at the reference voltage the output signal is shifted by the circuit comprising transistor $Tr_{03}$ and $Tr_{02}$ to provide a current output signal $I_0$ and a voltage output signal Eo at output terminals $T_3$ and $T_4$, said output signals $I_0$ *and* $E_o$ utilizing the voltages of zero volt line $1_0$ and common signal line $1_{SC}$ as the references. The output voltage $E_{01}$ of this controller is expressed by equation (5).

$$E_{01} = \frac{Rf}{Ri} \cdot \frac{1}{n} \cdot \alpha \cdot \frac{1 + n \cdot R_D C_D S}{1 + R_D C_D S} \cdot \frac{C_I}{C_M} \left( 1 + \frac{1}{m \cdot C_I R_I S} \right) (e_M - E_S) \quad (5)$$

where $\frac{1}{n} = \frac{R_{32}}{R_{31} + R_{32}}$ $$\frac{1}{\alpha} = \frac{R_{21}}{R_{21} + R_{22}} \text{ and}$$

$$\frac{1}{m} = \frac{R_{12}}{R_{11} + R_{12}}$$

In this embodiment, however, since the zero volt line of the source and the zero volt line of the signal are comprised by a signal common line there is a fear that the voltage drop caused by the source current might cause an error of the signal. To avoid this it is advantageous to separate zero volt line $1_0$ and common signal line $1_{SC}$ as shown in FIG. 13 and connect them to the source at a point in the system.

Figure 14:
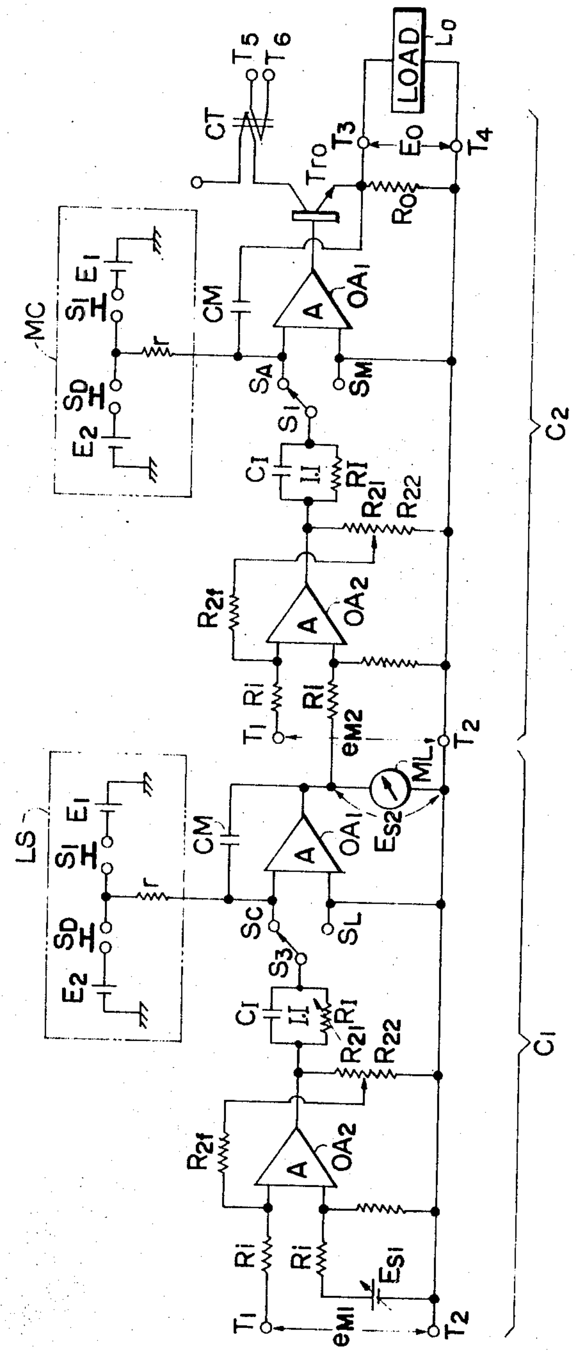
FIGS. 14 to 16 inclusive shown connection diagrams of cascade setting controlling devices utilizing novel controllers.
Figure 15:
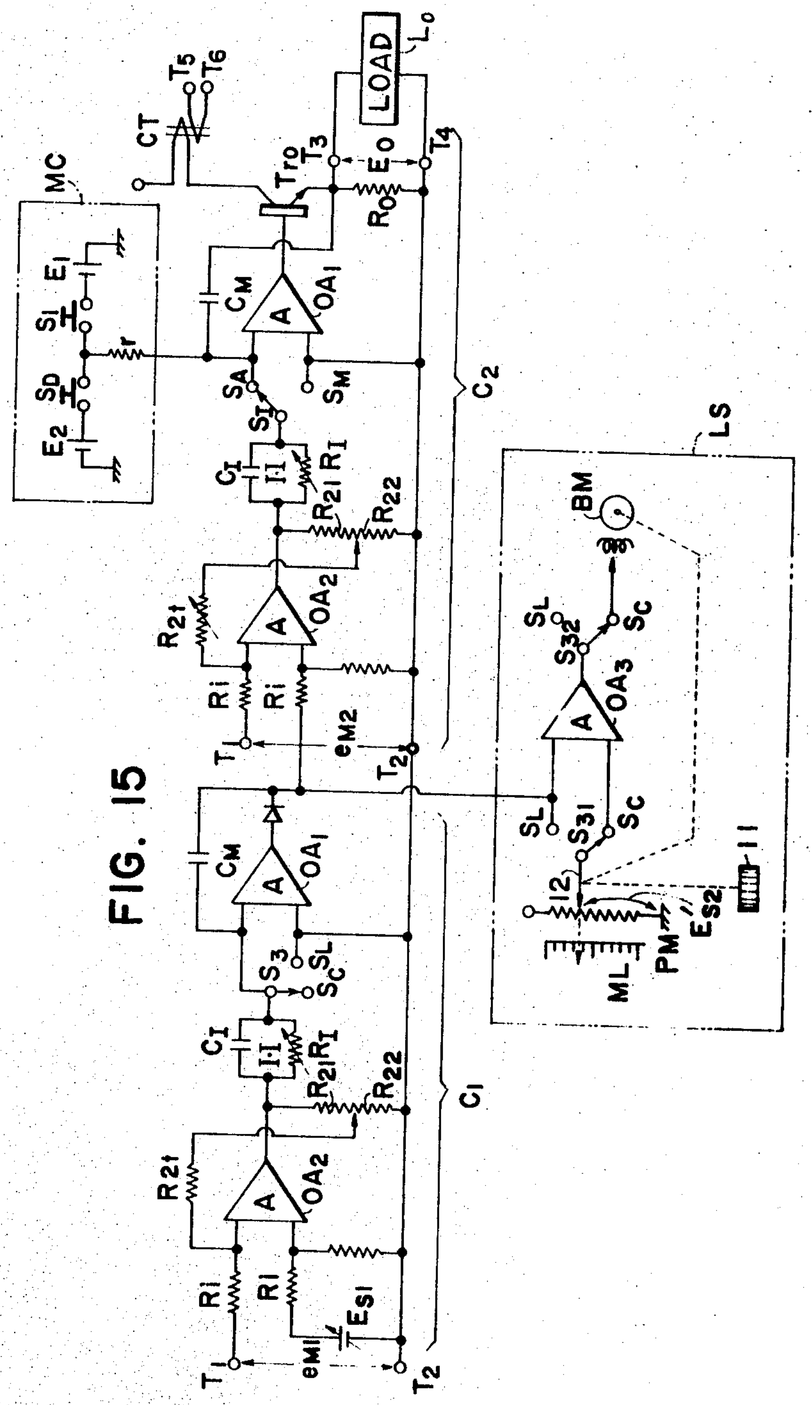
Figure 16:
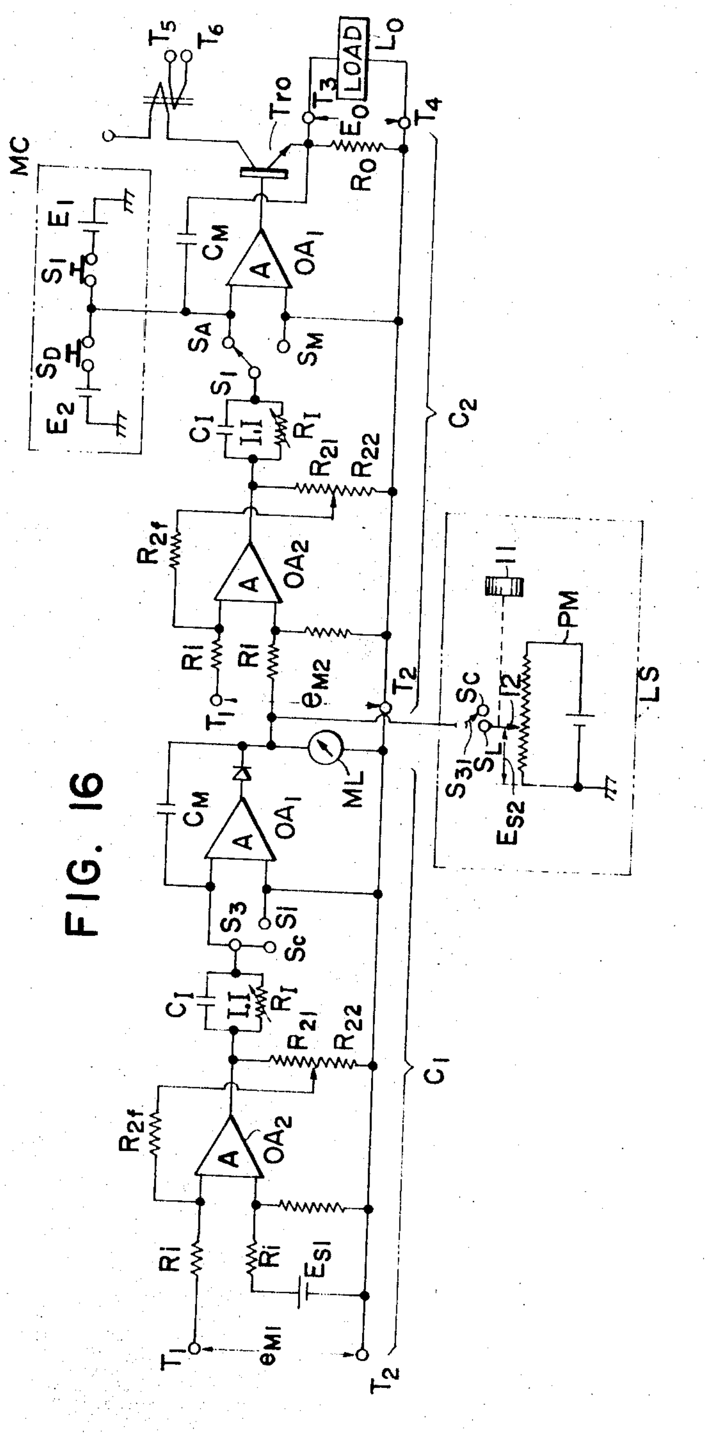

FIGS. 14 through 16 illustrate connection diagrams of cascade setting controlling devices or circuits utilizing the novel controller.

The cascade setting controlling device comprises a primary controller and a secondary controller with the output from the primary controller utilized as the set value of the secondary controller, such controller device being frequently used where the control loop of the primary controller involves a large delay. In such a cascade setting controller device, in addition to providing control by the cascade setting it is constructed such that it can also provide a control by the so-called local setting in which a manually controlled output is utilized at the set value of the secondary controller.

In each of the embodiments shown in FIGS. 14 through 16 the switching operation between the cascade setting and the local setting can be made without bumps. The embodiment shown in FIG. 14 comprises a primary controller $C_1$ and a secondary controller $C_2$ which are of substantially the same construction providing proportionating and integrating operations. The operational amplifier $OA_2$ of the primary controller $C_1$ operates to amplify the difference between a measured signal $e_M$ from a processing system, not shown, and a reference value $E_{S1}$ to apply its output to one terminal of an input impedance circuit I.I including capacitor $C_I$ and resistor $R_I$, and a portion of the output voltage derived from a potentiometer comprised by resistors $R_{21}$ and $R_{22}$ that determine the proportionality constant is negatively fed back to one input terminal of operational amplifier $OA_2$ through feedback resistor $R_2F$. A cascade-local transfer switch $S_3$ adapted to transfer between cascade setting and local setting is thrown to contact SC during the cascade setting operation to couple the output from operational amplifier $OA_2$ to the input terminal of operational amplifier $OA_1$ via input impedance circuit I.I whereas during local setting transfer switch $S_3$ is thrown to contact $S_1$ to ground the output from operational amplifier $OA_2$ through input impedance circuit I.I. The output from operational amplifier $OA_1$, that is the output from the primary controller $C_1$ is impressed upon one input terminal of the operational amplifier $OA_2$ of the secondary controller as the set value or reference signal therefore, and is also fed back to the input terminal of operational amplifier $OA_1$ through capacitor $C_M$. Consequently, capacitor $C_M$ stores the output signal from the primary controller $C_1$, that is the set value signal of the secondary controller $C_2$. A local setter LS comprises local setting switches $S_I$ and $S_D$ and local setting sources $E_1$ and $E_2$, and the output from local setter LS is connected to the input terminal of operational amplifier $OA_1$ through resistor *r*. The relationship between input signal $e_{M1}$ and output voltage $E_{S2}$ of the primary controller $C_1$ described above can be shown by following equation (6)

$$E_{S2} = (e_{M1} - E_{S1}) \frac{R_2 f}{Ri} \cdot \frac{R_{21} + R_{22}}{R_{22}} \cdot \frac{C_I}{C_M} \left( 1 + \frac{1}{C_I R_I S} \right) \quad (6)$$

In the secondary adjusted $C_2$, operational amplifier $OA_2$ operates to amplify the difference between measured signal $e_{M2}$ from the processing system and the output signal from the primary controller $C_1$ to apply its output to one end of the input impedance circuit I.I including capacitor $C_I$ and resistor $R_I$. A fraction of this output voltage derived from potentiometer resistors $R_{21}$ and $R_{22}$ which determine the proportionality constant is negatively fed back to the input terminal of operational amplifier $OA_2$ through resistor $R_2f$. Manual-automatic transfer switch $S_1$ for switching the operation between the automatic control and the manual control is thrown to contact $S_M$ during the automatic control operation to ground the output from the operational amplifier $OA_1$ via input impedance circuit I.I. Whereas during the automatic adjustment operation the transfer switch $S_1$ is thrown to contact $S_A$ to connect the output from operational amplifier $OA_2$ to the input terminal of operational amplifier $OA_1$ via input impedance circuit I.I. The output from operational amplifier $OA_1$ is amplified by output transistor $T_{ro}$ to produce output voltage $E_o$ across output terminals $T_3$ and $T_4$. A current output is obtained from output terminals $T_5$ and $T_6$ through current transformer $C_T$. Since output voltage $E_0$ is fed back to the input terminal of operational amplifier $OA_1$ through capacitor $C_M$ this capacitor stores a voltage corresponding to output voltage $E_o$. As shown, the output terminal of manual setter MC is connected to the input terminal of operational amplifier $OA_1$ through resistor *r*.

The embodiment shown in FIG. 14 operates as follows: To perform a control determined by the cascade setting, cascade-local transfer switch $S_3$ in the primary controller $C_1$ is thrown to contact $S_C$, while manual-automatic transfer switch $S_1$ in the secondary controller to contact $S_A$. Under these conditions the set value of the secondary controller $C_2$ is set by the output from the primary controller $C_1$ utilizing the measured signal $e_{M1}$ as its input signal. In other words, the output signal from the primary controller $C_1$ is directly used as the set value signal $E_{S2}$ of the secondary controller $C_2$. Consequently, output voltage $E_o$ under this cascade control condition is given by following equation (7).

$$Eo=(e_{M2}-E_{S2})\frac{R_2f}{R_I}\cdot\frac{R_{21}+R_{22}}{R_{22}}\cdot\frac{C_I}{C_M}\left(1+\frac{1}{C_IR_IS}\right)\quad(7)$$

To switch the operation from this control by the cascade setting to the control by local setting, the cascade-local transfer switch $S_3$ of the primary controller $C_1$ is thrown to contact $S_L$. Then the circuit comprising operational amplifier $OA_1$ of the primary controller $C_1$ and capacitor $C_M$ will act as a holding amplifier to produce an output corresponding to the voltage which has been stored in capacitor $C_M$. Since capacitor $C_M$ has been storing the output voltage of operational amplifier immediately prior to the switching of transfer switch $S_3$ or the set voltage $E_{S2}$ of the secondary controller $C_2$ it is possible to switch from the control by the cascade setting to the control by the local setting without bumps.

The control by the local setting can be effected by suitably closing either one of local setting switches of local setter LS while observing the reading of indicating meter ML that indicates set value signal $E_{S2}$ of the secondary controller $C_2$, thus varying the charging voltage for capacitor $C_M$. Under this control condition by the local setting, since one terminal of input impedance circuit I.I of the primary controller $C_1$ is grounded through transfer switch $S_3$, this grounded terminal is kept at the zero potential irrespective of the value of the input deviation signal. For this reason, even when the operation is transferred from the control by the local setting to the control by the cascade setting by transferring the transfer switch $S_3$ of the transfer switch $S_3$ of the primary controller from contact $S_L$ to contact $S_C$ there is no fear of bumps.

In this embodiment, to provide the manual control operation, the manual-automatic transfer switch $S_1$ of the secondary controller $C_2$ is thrown to contact $S_M$, and either one of manual controlling switches $S_I$ or $S_D$ of manual setter MC is suitably closed thus varying the charging voltage for capacitor $C_M$ of the secondary controller $C_2$.

Although in this embodiment, both primary and secondary controllers have been shown as being comprised by proportional and integrating controllers it will be understood that they may be comprised by proportional, integrating and differentiating controllers.

FIGS. 15 is a connection diagram of still another example of the cascade setting control device. In this embodiment local setter LS comprises a voltage generating circuit PM wherein the voltage generated by a brush 12 is varied by moving the brush by a local set value adjusting knob 11, cascade-local transfer switches $S_{31}$ and $S_{32}$ for switching between the cascade setting and the local setting, an operational amplifier $OA_3$ and a balancing motor BM driven by the output from operational amplifier $OA_3$ to move brush 12 of the voltage generator PM. In this local setter LS, to perform the control by the cascade setting, transfer switches $S_{31}$ and $S_{32}$ are thrown to their contacts SC to constitute a servo circuit by operational amplifier $OA_3$, balancing motor BM and voltage generator PM thus causing the local setter LS to act as an indicating meter wherein the output $E_{S2}$ from the primary controller $C_1$ is indicated by the position of brush 12. Further to effect the control by the local setting, transfer switches $S_{31}$ and $S_{32}$ are thrown to their contacts $S_L$. Then, as the balancing motor BM is disconnected from the output terminal of operational amplifier $OA_3$ the brush 12 of voltage generator PM will maintain the output signal $E_{S2}$ from the primary controller $C_1$ immediately before transfer of transfer switches $S_{31}$ and $S_{32}$, and a circuit is constructed utilizing the voltage maintained at brush 12 as the set value signal for the secondary controller $C_2$. Thus, it is possible to switch from the control by the cascade setting to the control by the local setting without bumps. The control effected by the local setting may be performed by controlling the local set value adjusting knob 11 to vary the voltage $E_S{'}_2$ generated by voltage generator PM. Since at this time, one terminal of capacitor $C_M$ of the primary controller $C_1$ is grounded through switch $S_3$, this capacitor $C_M$ stores voltage $E_S{'}_2$ generated by voltage generator PM of local setter LS. One end of the input impedance circuit comprising capacitor $C_I$ and resistor $R_I$ of the primary controller $C_1$ is also grounded through switch $S_3$, so that this end is maintained at the zero potential regardless the value of input signal $e_{M1}$. As a result, it is possible to switch the operation from the control by the local setting to the control by the cascade setting without bumps by throwing switch $S_3$ of the primary controller $C_1$ and switches $S_{31}$ and $S_{32}$ of the local setter to their contacts $S_C$.

FIG. 16 shows still another example of the cascade setting controlling device embodying this invention. In this embodiment, the local setter LS comprises a voltage generating circuit PM wherein the voltage generated at brush 12 is varied by moving the brush by means of a local set value adjusting knob 11. An indicating meter ML is connected between the output terminal of operational amplifier $OA_1$ of the primary controller $C_1$ and the common line to indicate the output signal from the primary controller $C_1$. With this embodiment, to effect the control by the cascade setting the switch $S_3$ of the primary controller $C_1$ is thrown to contact $S_C$ whereas in the local setter LS, switch $S_{31}$ is thrown to contact $S_C$ (it is assumed now that the switch $S_1$ of the secondary controller $C_2$ is engaging contact $S_A$). Under these circumstances, the set value of the secondary controller $C_2$ is set by the output from the primary controller $C_1$ utilizing the measured signal $e_{M1}$ from the processing system as its input signal. In other words, the output from the primary controller $C_1$ is directly used as the set value of the secondary controller.

To switch the operation from the control by the cascade setting to the control by the local setting switch $S_3$ of the primary controller $C_1$ is thrown to its contact $S_L$ while at the same time switch $S_{31}$ of local setter LS is thrown to contact $S_L$. Then one end of the input impedance circuit of the primary controller $C_1$ is grounded and one input to the operational amplifier $OA_1$ and one terminal of capacitor $C_M$ are also grounded. In the local setter LS, its output voltage $E_S{'}_2$ charge or discharges capacitor $C_M$ of the primary controller and the output voltage is also applied to the secondary controller $C_2$ as its set value input. In this manner, the control by local setter LS can be provided by adjusting the voltage $E_S{'}_2$ generated by voltage generator PM by controlling the local set value adjusting knob while observing the indication of meter ML. If, prior to the transfer of switches $S_3$ and $S_{31}$ from contacts to contacts $S_L$, the output voltage $E_S{'}_2$ of the local setter LS were controlled to be equal to the output voltage from the primary controller $C_1$, such switching could be made without bumps. During control by the local setting, since one terminal of capacitor $C_M$ of the primary controller $C_1$ is grounded, this capacitor stores the output voltage $E_S{'}_2$ from local setter LS. Further, as one terminal of the input impedance circuit of the primary controller $C_1$ is grounded through switch $S_3$, this grounded terminal is also maintained at the zero potential irrespective of the value of input signal $e_{M1}$. As a result, the switching operation from the control by the local setting to the control by the cascade setting effected by connecting switch $S_3$ of the primary controller $C_1$ to contact $S_C$ and switch $S_{31}$ of the local setter LS to contact $S_{C1}$ can be made without bumps.

Figure 17:
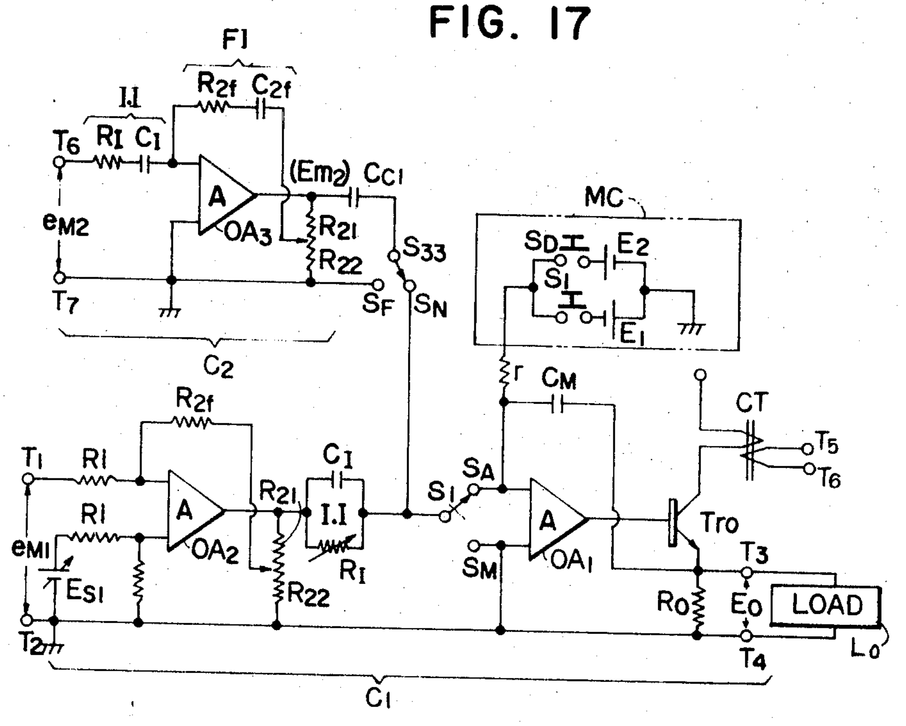
FIG. 17 is a connection diagram of an automatic control apparatus utilizing the novel controller as a feed forward input.

FIG. 17 shows a connection diagram of the novel controller as applied to an automatic control device including a feed forward input. The control device comprises a feedback controller $C_1$ and a feed forward signal generating circuit $C_2$. Feedback controller $C_1$ comprises input terminals $T_1$ and $T_2$ for receiving a feedback input signal $e_{M1}$ from the processing system, not shown, a source of reference signal $E_{S1}$, an operational amplifier $OA_2$ and resistors $R_{21}$ and $R_{22}$ for controlling the proportionality gain the operational amplifier $OA_2$ functions to amplify the difference between input signal $e_{M1}$ and the reference signal $E_{S1}$. Again the input impedance circuit I.I is comprised by a capacitor $C_1$ and a variable resistor. The control device further comprises a manual-automatic transfer switch $S_1$ for switching the operation between the manual control and the automatic control, an operational amplifier $OA_1$, a capacitor $C_M$ to store a voltage corresponding to output voltage $E_0$ supplied to the load, the capacitor $C_M$ also serving as the feedback circuit for the operational amplifier $OA_1$. The output terminal of manual setter MC is connected to one input of the operational amplifier $OA_1$ via a resistor $r$.

The feed forward signal generating circuit $C_2$ comprises input terminals $T_6$ and $T_7$ for receiving external disturbance signals, an operational amplifier $OA_3$, a resistor Ri, and a capacitor Ci, these last mentioned two elements comprising an input impedance circuit I.I for operational amplifier $OA_3$. The feed forward signal generating circuit further comprises resistors $R_{21}$ and $R_{22}$ for controlling the proportionality gain and a feedback circuit for the operational amplifier $OA_3$ comprised by a resistor $R_{2f}$ and a capacitor $C_{2f}$. The feed forward signal generated by feed forward signal generating circuit $C_2$ is coupled to one terminal of the input impedance circuit I.I of feedback controller $C_1$ via a capacitor $C_{CI}$ and a switch $S_{33}$.

The automatic control device shown in FIG. 17 operates as follows: To provide a normal feedback control, manual-automatic transfer switch $S_1$ is thrown to contact $S_A$ and switch $S_{33}$ to contact $S_F$. Then the output from the feed forward signal generating circuit $C_2$ is grounded through contact $S_F$ of switch $S_{33}$. In the feedback controller $C_1$, the input impedance circuit I.I is connected to the input terminal of operational amplifier $OA_1$ through manual-automatic transfer switch $S_1$ so that a different signal between input signal $e_{M1}$ and a reference signal $E_{S1}$ is applied to the input terminal of operational amplifier $OA_1$ via input impedance circuit I.I. Under these conditions, the control device operates in the same manner as the basic controller shown in FIG. 1. Since, at this time, one terminal of capacitor $C_{CI}$ which is connected to the output terminal of the feed forward signal generating circuit $C_2$ is grounded through switch $S_{33}$, this grounded terminal is always maintained at the ground potential irrespective of the value of the external disturbance signal.

During this feedback control operation, in order to apply feed forward signal $Em_2$, switch $S_{33}$ is thrown to contact $S_N$. Then the feed forward signal $Em_2$ from feed forward signal generating circuit $C_2$ is applied to the input terminal (the point of addition) of operational amplifier $OA_1$ via capacitor $C_{CI}$ and switch $S_{33}$. The output voltage under these conditions is given by following equation (8)

$$Eo=(e_{M1}-E_{S1})\frac{R_{21}+R_{22}}{R_{22}}\cdot\frac{C_I}{C_M}\left(1+\frac{1}{C_IR_IS}\right)+e_{M2}\frac{C_{CI}}{C_M}GF(s) \quad (8)$$

where GF(s) represents the transfer function of the feed forward signal generating circuit $C_2$.

At the moment when switch $S_{33}$ is transferred from contact $S_F$ to contact $S_N$, one terminal of capacitor $C_{CI}$ and the input terminal (the point of addition) of the operational amplifier $OA_1$ are maintained at the zero potential so that when switch 33 is transferred as above described to perform the feedback control, even when both feedback control and the feed forward control are used, the output voltage Eo does not vary at that moment.

Where both feedback control and feed forward control are used as above described a voltage corresponding to output voltage $E_o$ is stored in capacitor $C_M$, removal of feed forward signal $Em_2$ caused by the connection of switch $S_{33}$ with contact $S_F$ does not cause any rapid variation in the output voltage $E_o$.

In this control device, the transfer function of the feed forward signal generating circuit $C_2$ is suitably modified according to the field of application of the control system.

Figure 18:
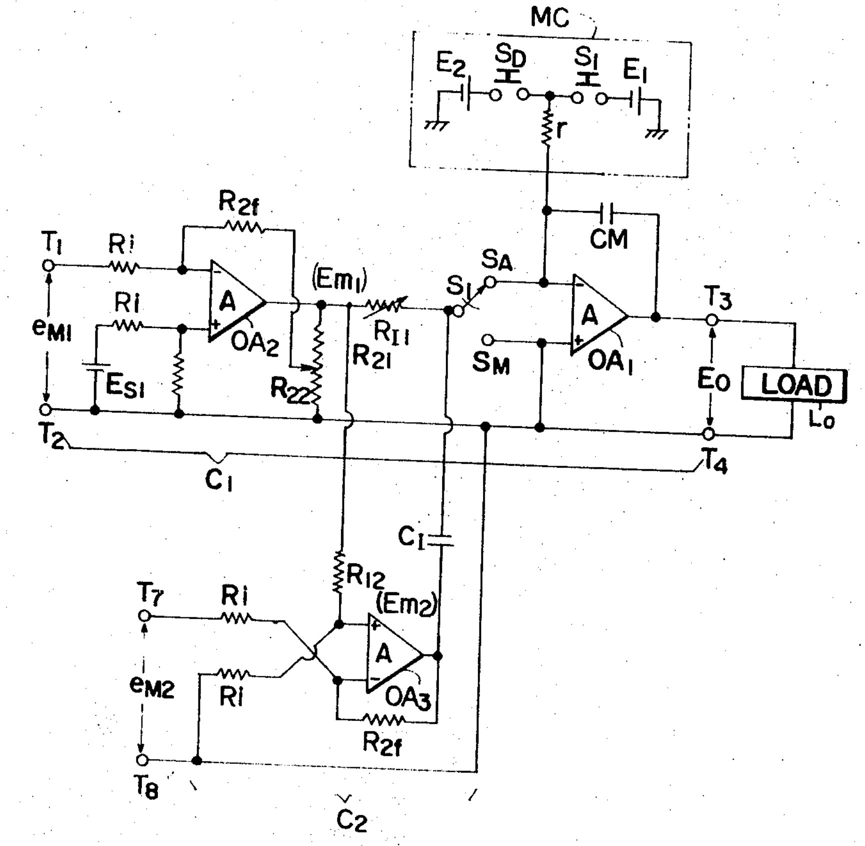
FIGS. 18 and 19 show modifications of the automatic control apparatus shown in FIG. 17.

FIG. 18 shows a connection diagram of a modification of the control device shown in FIG. 17. The feed forward signal generating circuit $C_2$ of this modification comprises an operational amplifier $OA_3$ wherein when the external disturbance signal $e_{M2}$ is impressed upon one input terminal of the operational amplifier the output signal $Em_1$ of operational amplifier $OA_2$ of the feedback controller $C_1$ is impressed upon the other input terminal, and resistors $R_I$ and $R_{2f}$.

The input impedance circuit of this control device is comprised by a resistor $R_{11}$ and a capacitor $C_I$ and the output signal $Em_1$ from the operational amplifier $OA_2$ of the feed forward controller $C_1$ is given by following equation (9).

$$Em_1=\frac{R_{21}+R_{22}}{R_{22}}(e_{M1}-E_{S1}) \quad (9)$$

Operation amplifier $OA_3$ of the feed forward signal generating circuit $C_2$ operates to add (or subtract) the external disturbance signal $e_{M2}$ and the output signal $Em_1$ of operational amplifier $OA_2$ expressed by equation (8), so that the output signal $Em_2$ of the operational amplifier $OA_3$ is given by $$Em_2=Em_1-e_{M2}$$

$$=-\frac{R_{21}+R_{22}}{R_{22}}(e_{M1}-E_{S1})-e_{M2} \quad (10)$$

Under the automatic control condition in which manual-automatic transfer switch $S_1$ engages contact $S_A$, the output signal of operation amplifier $OA_2$ given by equation (8) is applied to the input terminal of operational amplifier $OA_1$ while feed forward signal $Em_2$ given by equation (9) is impressed upon the same input terminal via capacitor $C_I$ so that with a sufficiently high gain of the operational amplifier $OA_1$, the output voltage Eo is given by equation (11).

$$Eo=-Em_1\cdot\frac{1}{C_MR_{I1}S}-Em_2\frac{C_I}{C_M}$$

$$=-\frac{R_{21}+R_{22}}{R_{22}}(e_{M1}-E_{S1})\cdot\frac{1}{C_MR_{I1}S}+\frac{C_I}{C_M}\left\{\frac{R_{21}+R_{22}}{R_{22}}(e_{M1}-E_{S1})+e_{M2}\right\}$$

$$=n\cdot\frac{C_{I1}}{C_M}\left(1+\frac{1}{C_{I1}R_IS}\right)(e_{M1}-E_{S1})+\frac{C_{I1}}{C_M}\cdot e_{M2}+\frac{C_{I1}}{C_M}\cdot e_{M2} \quad (11)$$

As can be clearly noted from equation (11), this control device performs proportional and integrating operations upon the difference signal between input signal $e_{M1}$ and reference signal $E_{S1}$, with a proportionality gain $C_{I1}/C_M$ and an integrating constant $C_{I1}$ $R_I$. For the external disturbance signal $e_{M2}$ the control device performs proportionating and integrating operations with the proportionality gain $C_{I1}/C_M$.

Figure 19:
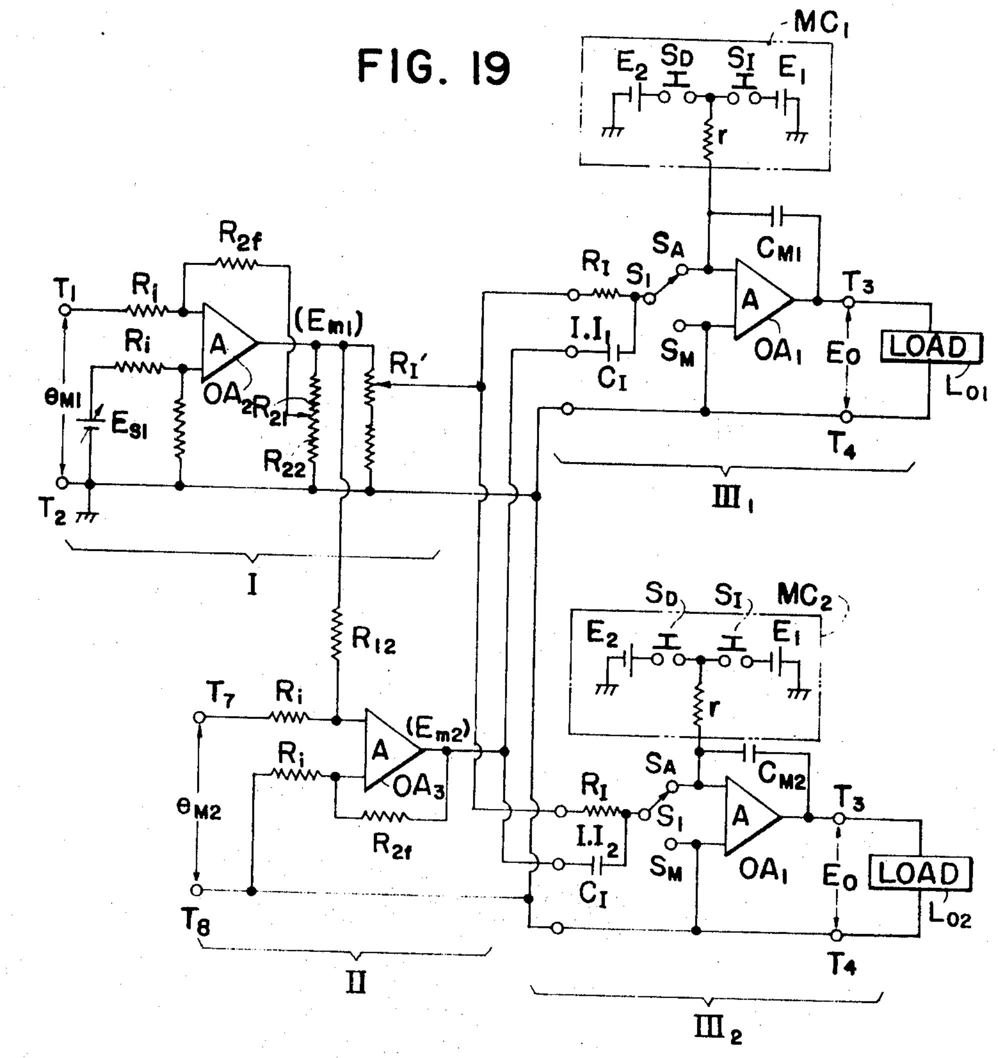

FIG. 19 shows a connection diagram of still further modification of the control device shown in FIG. 17. In a processing system for controlling the combustion condition of a large boiler, for example, as the quantity of air fed to the boiler is large it is often necessary to provide two or more values (the load of the control system) for controlling the air quantity. The embodiment shown in FIG. 19 is suitable to control such a processing system. The control device shown in this figure comprises an operator section I connected to receive a measured signal $e_{M1}$ from the processing system, a feed forward signal generating circuit connected to receive the external disturbance signal $e_{M2}$ and the output signal $Em_1$ of the operator I via resistor $R_{12}$, an output section III including a manual setter $MC_1$ to provide an output signal for load $L_{01}$ and a second output section having a manual setter $MC_2$ to provide an output signal to another load $L_{02}$.

Operator section I, feed forward signal generating circuit II and output section $III_1$ cooperate to constitute a control device for driving load $L_{01}$ while operator section I, feed forward signal generating circuit II and output section $III_2$ cooperate to constitute a control device for driving load $L_{02}$. Thus, with this control device it is possible to control automatically both loads $L_{01}$ and $L_{02}$ just in the same manner. Where it is desired to manually control load $L_{01}$ alone, manual-automatic transfer switch $S_1$ of the output section $III_1$ is transferred from contact $S_A$ to contact $S_M$ and either one of the switches $S_I$ or $S_D$ of manual setter $MC_1$ is suitably closed. More particularly, when transfer switch $S_1$ of the output section $III_1$ is thrown to contact $S_M$, operational amplifier $OA_1$ operates as a holding amplifier to utilize the voltage which has been stored in capacitor $C_{M1}$ as the output so that it is possible to manually control only load $L_{O1}$ by closing either one of the switches $S_I$ or $S_D$ of manual setter $MC_1$ to vary the charging voltage for capacitor $C_{M1}$. Under this manual control condition of load $L_{O1}$ since one terminal of capacitor $C_I$ comprising the input impedance circuit of the output section $III_1$ is grounded through transfer switch $S_1$ this capacitor stores the output voltage $Em_2$ of feed forward signal generating circuit II. As a result, by increasing the value of resistor $R_I$ comprising the input impedance circuit, transfer operation from the automatic control to the manual control in the output section $III_1$ does not affect in any way the automatic control operation in the output section $III_2$.

According to this control system it is possible to provide identical automatic control for two or more loads by utilizing the measured signal $e_{M1}$ from the processing system and the external disturbance signal $e_{M2}$ as the input signals. Further, during the manual control operation it is possible to manually control only the desired load without affecting the other load.

Figure 20:
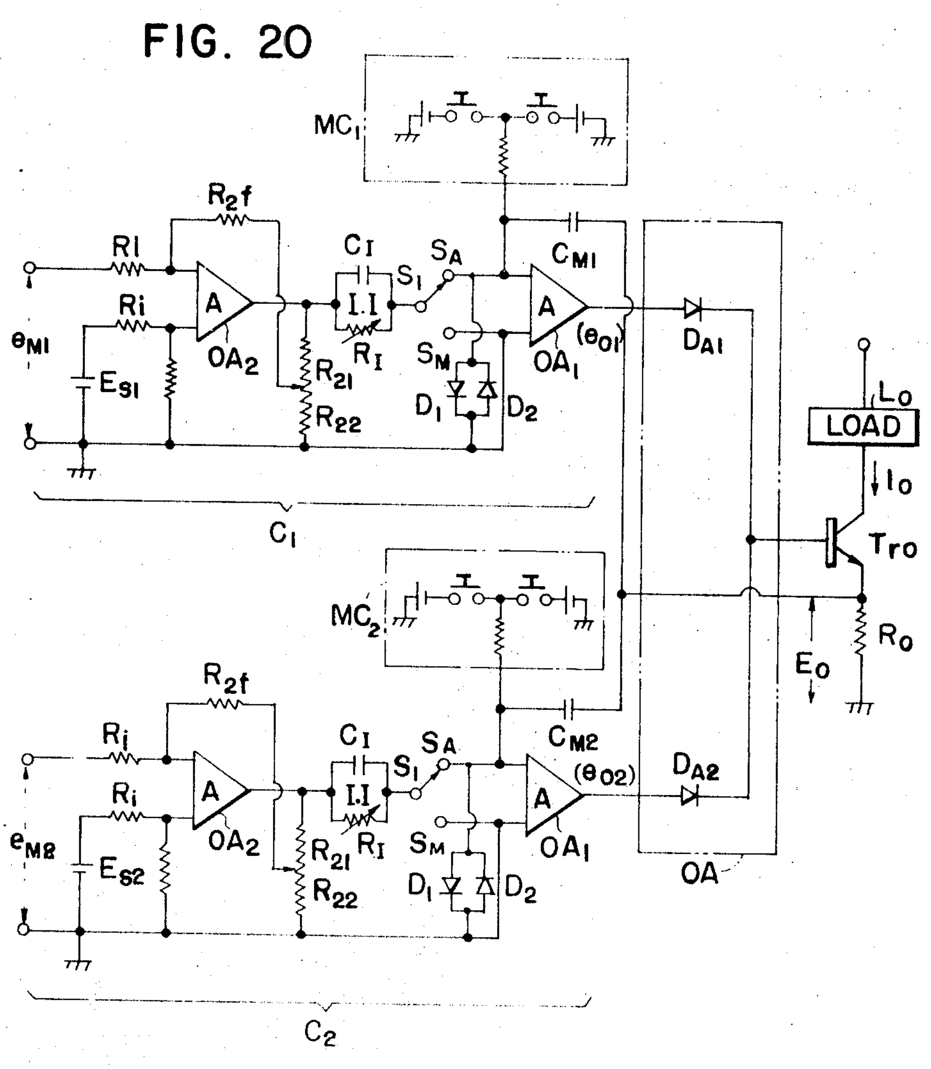
FIG. 20 shows a connection diagram of automatic selector controlling device wherein two or more controllers are employed and the maximum or minimum output signal of these controllers is automatically selected to control a load.

FIG. 20 illustrates an electrical connection diagram of the novel control as applied to an automatic selector adjuster device wherein two or more controllers are employed and the largest or smallest output signal among the output signals from these plurality of controllers is selected automatically to control a single load. This system is suitable to automatically control the controlled quantity of the processing system to prevent it from exceeding a certain upper limit (or decreasing below a lower limit) in order to assure safety operation of the plant.

In the illustrated embodiment, two controllers $C_1$ and $C_2$ are used and larger one of the output signals from these controllers is selected automatically and applied to the load. In this embodiment, controller $C_1$ utilizes the measured signal $e_{M1}$ from the processing system as its input signal whereas controller $C_2$ utilizes the measured signal $e_{M2}$ from the processing system as its input signal. Controllers $C_1$ and $C_2$ have substantially the same circuit construction. Output terminal of controller $C_1$ (that is the output terminal of operational amplifier $OA_1$) is connected to the base electrode of output transistor Tro through a diode $DA_1$ while the output terminal of controller $C_2$ (that is the output terminal of operational amplifier $OA_1$) is connected to the base electrode of output transistor Tro through another diode $DA_2$. Diodes $DA_1$ and $DA_2$ constitute an automatic selector circuit AS. One terminal of each capacitor $C_{M1}$ and $C_{M2}$ of controllers $C_1$ and $C_2$ is connected to one terminal of a load resistor $R_o$, so that each capacitor stores a voltage corresponding to the output voltage $E_0$.

Assuming now that the output signal $e_{O1}$ from controller $C_1$ is larger than the output signal $e_{O2}$ from controller $C_2$, then diode $DA_1$ of the automatic selector circuit AS becomes conductive state and diode $DA_2$ is held non-conductive state. As a result output signal $e_{O1}$ from controller $C_1$ is applied to the base electrode of output transistor $T_{ro}$ to supply an output current to load $L_o$ and output load resistor $R_o$ corresponding to the output signal $e_{O1}$. Under these circumstances a voltage corresponding to the output signal $e_{O1}$ from controller $C_1$ is stored in capacitors $C_{M1}$ and $C_{M2}$ of controller $C_1$ and $C_2$, respectively.

If output signal $e_{O2}$ of controller $C_2$ increases to a value larger than the output signal $e_{O1}$ from controller $C_1$ then diode $DA_2$ will become conductive whereas diode $DA_1$ non-conductive. As a result, an output current $I_0$ corresponding to the output signal $e_{O2}$ of controller $C_2$ flows through the load $L_o$ and a voltage corresponding to output signal $e_{O2}$ is stored in capacitors $C_{M1}$ and $C_{M2}$ of controller $C_1$ and $C_2$, respectively.

Considering now the moment at which the signal supplied to the load $L_o$ is switched from the output of controller $C_1$ to that of controller $C_2$, these two output signals may become equal at that moment so that the capacitors $C_{M1}$ and $C_{M2}$ of controller $C_1$ and $C_2$, respectively store the same voltage. Thus the switching from controller $C_1$ to adjuster $C_2$ or vice versa is effected automatically without bumps.

Figure 21A:
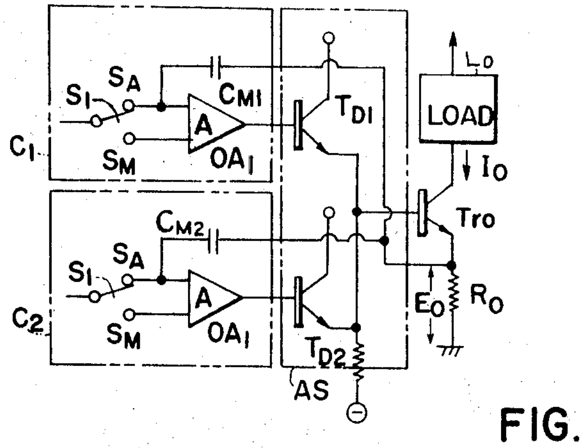
FIGS. 21A, 21B and 21C show modified automatic selecting circuits for use in the automatic selector adjusting device shown in FIG. 20.

FIG. 21A shows a modification of the automatic selector circuit AS shown in FIG. 20. Fore particularly, in the circuit shown in FIG. 21A diodes $DA_1$ and $DA_2$ in FIG. 20 are replaced by transistors $T_{D1}$ and $T_{D2}$ to construct the automatic maximum selector circuit AS for selecting larger one of the output signals from controller $C_1$ and $C_2$.

Figure 21B:
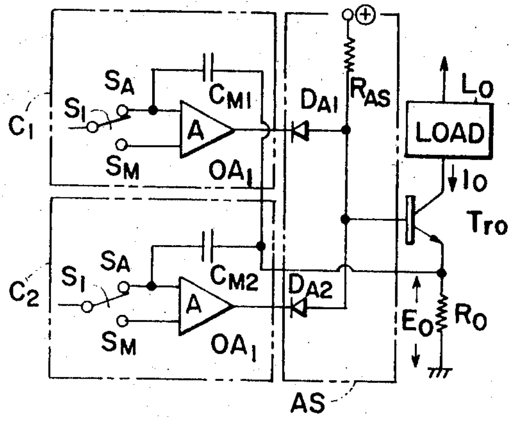

In another modification shown in FIG. 21B, the polarity of diodes $DA_1$ and $DA_2$ is reversed from that of the diodes shown in FIG. 20 and a source of positive polarity is connected to the anode electrodes of these diodes via resistor $R_{AS}$ so as to automatically select the smaller one of the output signals from controller $C_1$ and $C_2$ thus constituting a selector circuit AS for automatically selecting the minimum value.

Figure 21C:
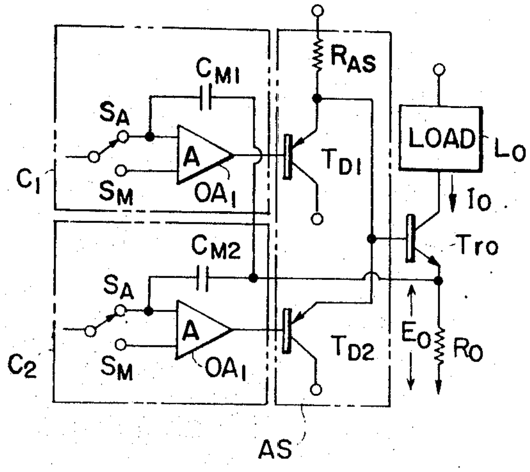

In another selector circuit AS for automatically selecting the minimum value shown in FIG. 21C diodes $DA_1$ and $DA_2$ shown in FIG. 21B are substituted by transistors $T_{D1}$ and $T_{D2}$, respectively.

Figure 22:
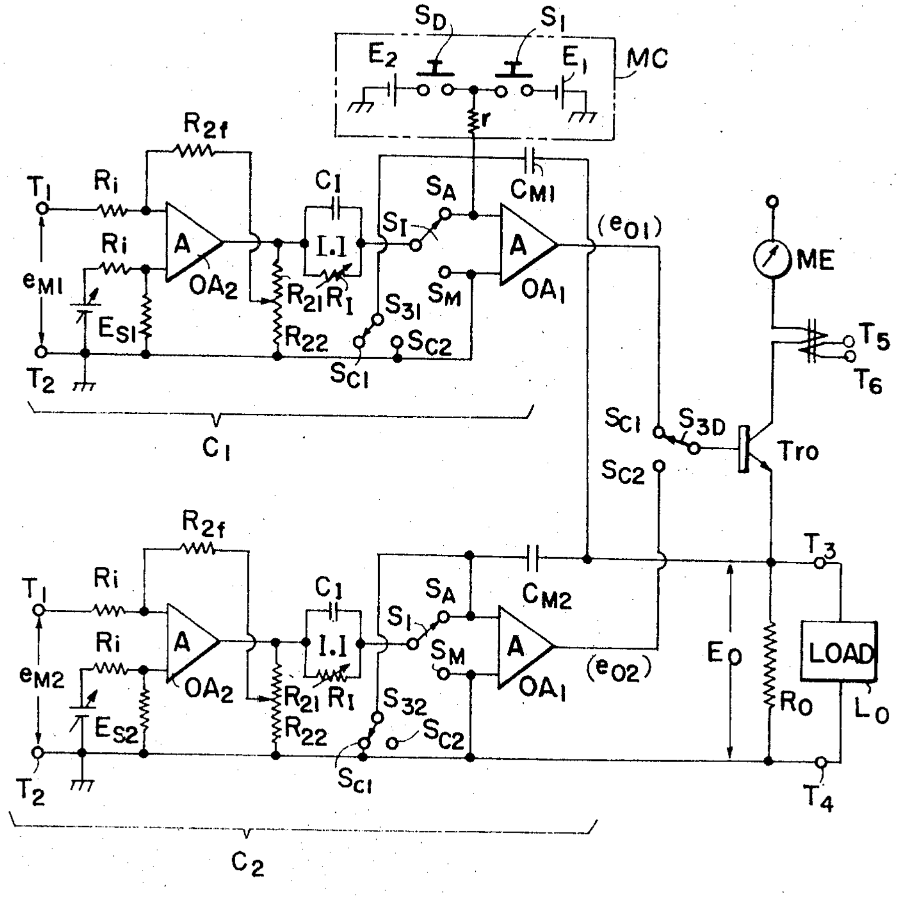
FIG. 22 is a connection diagram of one application of this invention wherein two or more controllers are switched to control a single operating end.

FIG. 22 shows a connection diagram of the novel controller applied to a control device wherein two or more controllers are switched to control the same operating end. In this embodiment, controller $C_1$ utilizes the measured signal $e_{M1}$ from the processing system as its input signal whereas controller $C_2$ utilizes the measured signal $e_{M2}$ from the processing system as its input signal. The output terminal of controller $C_1$ and that of controller $C_2$ are selectively connected to the base electrode of output transistor $T_{ro}$ by means of a transfer switch $S_{3D}$. One end of each capacitor $C_{M1}$ and $C_{M2}$ of controllers $C_1$ and $C_2$, respectively, are connected to one terminal of output load resistor $R_o$, each of said capacitors storing a voltage corresponding to output voltage $E_o$. It is to be understood that transfer switch $S_{3D}$ is interlocked with switches $S_{31}$ and $S_{32}$ adapted to connect one ends of capacitors $C_{M1}$ and $C_{M2}$ to the ground.

Where it is desired to control load $L_o$ in accordance with the output signal from controller $C_1$ transfer switch $S_{3D}$ is thrown to contact $S_{C1}$ and both switches $S_{31}$ and $S_{32}$ to their contacts $S_{C1}$. Then the output $e_{O1}$ of controller $C_1$ (that is the output of operational amplifier $OA_1$) is applied to the base electrodes of output transistor $T_{ro}$ to apply output voltage $E_o$ across output load resistor $R_o$. The output voltage $E_o$ is negatively fed back to the input terminal of operational amplifier $OA_1$ via capacitor $C_{M1}$. By selecting a sufficiently large gain for the operational amplifier $OA_1$, the output voltage $E_o$ can be expressed by equation (12).

$$Eo = (e_{M1} + E_{S1}) \frac{R_{21} + R_{22}}{R_{22}} \cdot \frac{C_I}{C_{M1}} \left(1 + \frac{1}{C_I R_I S}\right) \quad (12)$$

At this time the input terminal of operational amplifier $OA_1$ is maintained at the zero potential to store a voltage corresponding to output voltage $E_o$ in capacitor $C_{M1}$. Since one terminal of capacitor $C_{M2}$ of controller $C_2$ is applied with output voltage $E_o$ and the other terminal of the capacitor (that is the input terminal of operational amplifier $OA_1$) is grounded and maintained at the zero potential capacitor $C_{M2}$ also stores the voltage corresponding to output voltage $E_o$.

Accordingly as the transfer switch $S_{3D}$ is thrown to contact $S_{C2}$ from contact $S_{C1}$ so as to control load $L_o$ by the output signal $e_{O2}$ from operational amplifier $OA_1$ of controller $C_2$, the circuit comprising this operational amplifier and capacitor $C_{M2}$ functions as a holding amplifier to supply the voltage which has been stored in capacitor $C_{M2}$ as the output voltage. In this manner, it is possible to switch the control of output voltage from controller $C_1$ to controller $C_2$ without accompanying rapid variation or bump.

The automatic control operation by controller $C_2$ can be made in exactly the same manner as by controller $C_1$. Since, at this time, capacitor $C_{M2}$ of controller $C_2$ and capacitor $C_{M1}$ of controller $C_{M1}$ store the voltage corresponding to the output voltage $E_0$, transfer of the operation from controller $C_2$ to controller $C_1$ can also be made without bumps.

Figure 23:
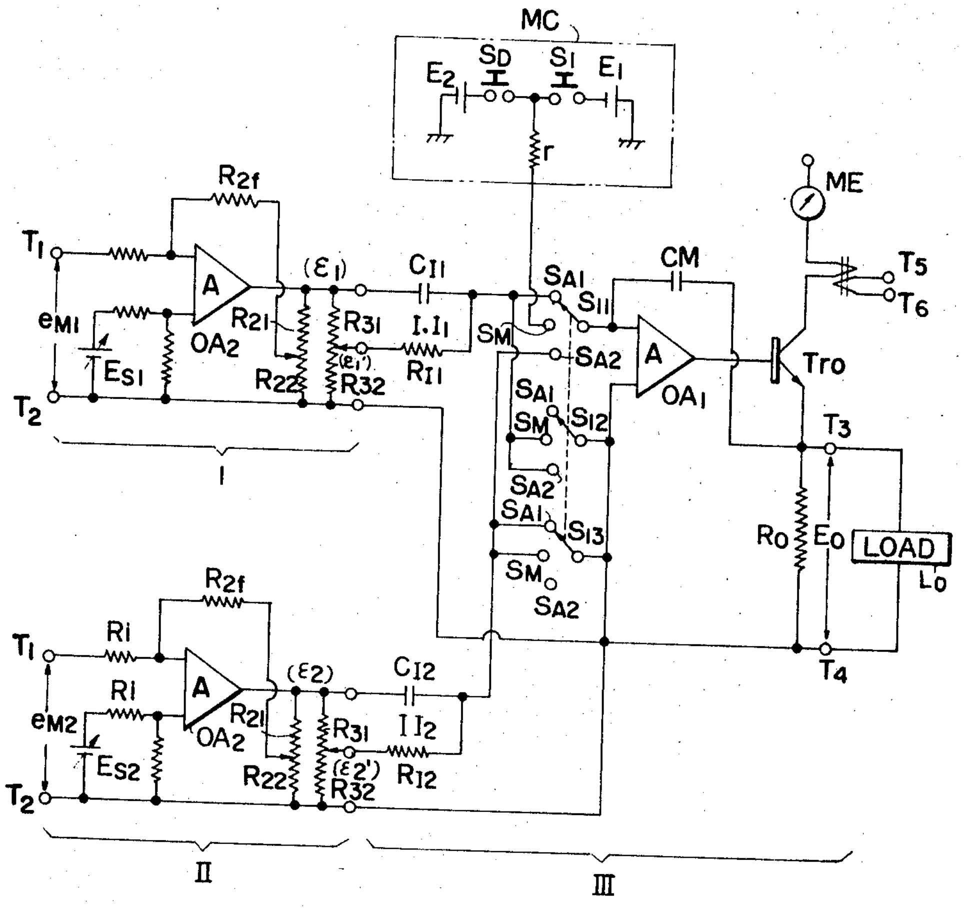
FIG. 23 shows a modification of the control apparatus shown in FIG. 22.

FIG. 23 shows a modification of the circuit shown in FIG. 22. The control circuit shown in FIG. 23 comprises a first operator section I utilizing the measured signal $e_{M1}$ from the processing system as its input signal, a second operator section II utilizing the measured signal $e_{M2}$ from the processing system at the input signal, and an output section III including a pair of input impedance circuits $II_1$ and $II_2$, transfer switches $S_{11}$, $S_{12}$ and $S_{13}$, an operational amplifier $OA_2$ and a capacitor $C_M$, said output section III supplying an output signal to load $L_o$. Transfer switches $S_{11}$, $S_{12}$ and $S_{13}$ are interlocked with each other and are interposed between the operational amplifier $OA_1$ and its input impedance circuits $II_1$ and $II_2$. These switches are operated to perform the control by operating section I, the manual control by manual setter MC or the control by the operator section II.

When it is desired to control load $L_o$ by the measured signal $e_{M1}$ transfer switches $S_1$, $S_2$ and $S_3$ are thrown to contacts $SA_1$, respectively. Then, the deviation signal $\epsilon_1$ from operator section I is applied to the input terminal of operational amplifier $OA_1$ in the output section III through capacitor $C_{I1}$ of input impedance circuit $II_1$. Further, a portion (signal $\epsilon'_1$) of deviation signal derived from potentiometer resistors $R_{31}$ and $R_{32}$ is impressed upon the input terminal of operational amplifier $OA_3$ via resistor $R_{I1}$. In this manner, operator section I and output section III cooperate to constitute a first controller which utilizes the measured signal $e_{M1}$ as the input signal. The output voltage Eo thus obtained is given by following equation (13).

$$e_0 = (e_{M1} - E_{S1}) \cdot \frac{R_{21}+R_{22}}{R_{22}} \cdot \frac{C_{I1}}{C_M} \left\{ 1 + \frac{1}{\frac{R_{31}+R_{32}}{R_{32}} C_{I1} R_{I1} S} \right\} \quad (13)$$

Under these circumstances the input terminal of operational amplifier $OA_1$ is maintained at the zero potential to store a voltage corresponding to output voltage $E_o$ in capacitor $C_M$ in the feedback circuit for the operational amplifier $OA_1$. One terminal of capacitor $C_{12}$ of the second input impedance circuit $II_2$ is maintained at the zero potential since it is grounded through transfer switch $S_{13}$, whereby the capacitor $C_{12}$ stores the deviation signal $\epsilon_2$ from operator section II. As a result, even when transfer switches $S_1$, $S_2$ and $S_3$ are transferred from their contacts $SA_1$ to contact $SA_2$ the circuit comprising operational amplifier $OA_1$ and capacitor $C_M$ functions as a holding amplifier which provides the voltage stored in capacitor $C_M$ as the output. For this reason, output voltage $E_o$ does not vary at all, so that it is possible to transfer the operation from the control by the deviation signal $\epsilon_1$ from operator section I to the control by the deviation signal $\epsilon_2$ from operator section II without bumps.

To utilize this embodiment as an automatic controller, transfer switches $S_1$, $S_2$ and $S_3$ are thrown to their contacts $S_M$, respectively, and either one of the manual switches $S_I$ and $S_D$ of the automatic setter MC is suitably closed to vary the charging voltage for capacitor $C_M$. Under this manual control condition effected by the manual control, since one ends of the first and second input impedance circuits $II_1$ and $II_2$ are grounded through transfer switches $S_2$ and $S_3$, these grounded terminals are always maintained at the zero potential irrespective of the values of deviation signals $\epsilon_1$ and $\epsilon_2$ supplied by operator sections I and II. For this reason, it is possible to transfer the operation from the manual control to the automatic control by operator section I or operator section II without bumps.

Figure 24:
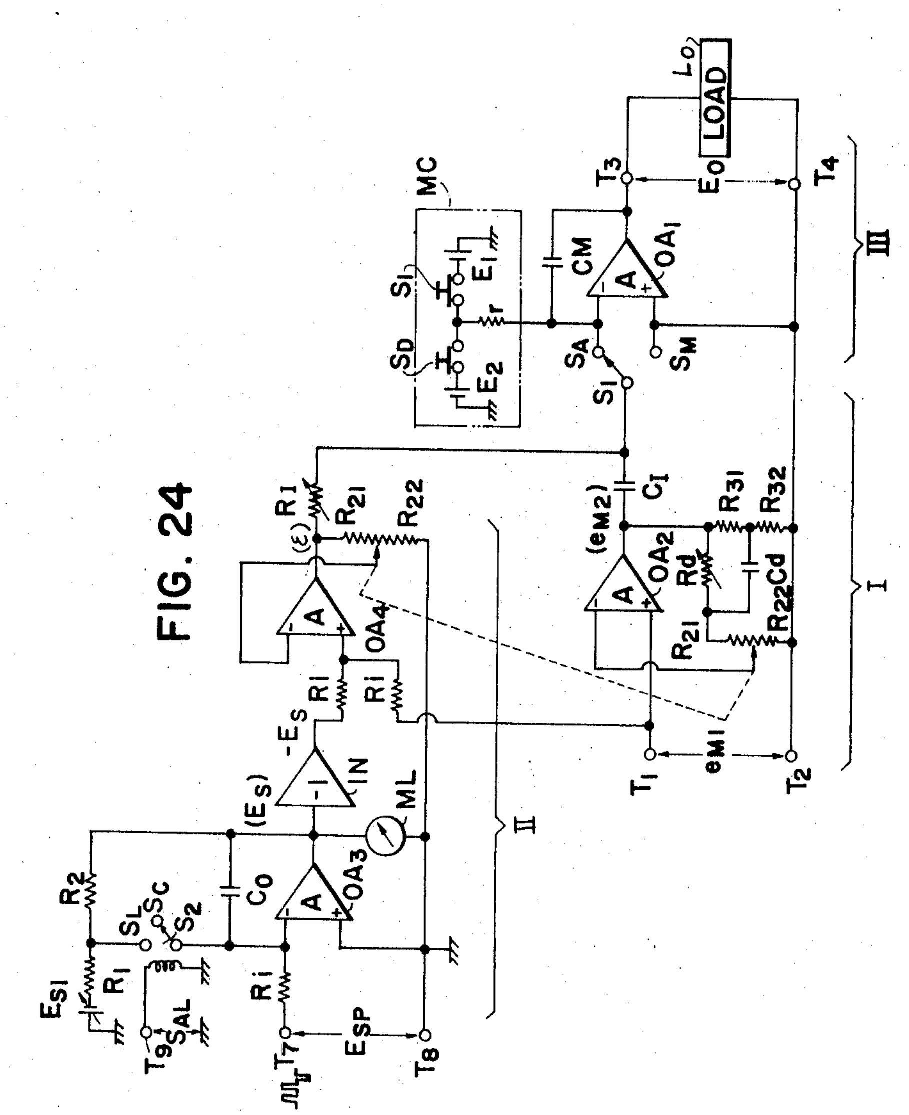
FIG. 24 shows another embodiment of the novel controller suitable for use in a computor wherein the set value signal is varied from time to time or for cascade control.

FIG. 24 shows an electrical connection diagram of another embodiment of the novel control which is suitable for use to control an electronic computor or to effect cascade control wherein the set value signal or reference signal varies from time to time. This embodiment comprises a first operator section I which is connected to receive the measured signal $e_{M1}$ from the processing system, a second operator section to which a pulse shaped reference signal $E_{SP}$ is supplied from an electronic computer, for example, and an output section III supplying an output signal to a load $L_o$. The first operator section I comprises an operational amplifier $OA_2$ and a feedback circuit for this operational amplifier including a variable resistor $R_d$ for determining the differentiation time constant, a differentiating capacitor $C_d$, resistors $R_{31}$ and $R_{32}$ for determining the range of the differentiation operation and resistors $R_{21}$ and $R_{22}$ for controlling the proportionality band. The second operator section II comprises an operational amplifier $OA_3$, a feedback capacitor $C_o$ for this operational amplifier, an indicating meter indicating the reference signal ML, a switch $S_2$ closed by a fault signal $S_{AL}$ impressed upon terminal $T_9$ and indicating a fault condition of a computer for example, a local setter generally represented by a variable source $E_{S1}$, an inverter IN for inverting the polarity of the output from the operational amplifier $OA_3$ and an addition amplifier $OA_4$ to add the output signal $E_S$ from inverter IN and the measured signal $e_{M1}$. The third operator section III comprises an operational amplifier $OA_1$, a capacitor $C_I$ and a resistor $R_I$ comprising the input impedance circuit for the operational amplifier $OA_1$, a manual-automatic transfer switch $S_1$ for transferring the operation between the manual control and the automatic control, a feedback capacitor $C_M$ for operational amplifier $OA_1$, and a manual setter MC.

To perform the automatic control, the manual-automatic transfer switch $S_1$ is thrown to contact $S_A$. Then the measured signal impressed upon input terminals $T_1$ and $T_2$ of the first operator section I is subjected to the proportionality gain and differentiating operations effected by operational amplifier $OA_2$ and its feedback operational circuit. As a result, the output signal $e_{M2}$ from operational amplifier $OA_2$ is given by equation (14).

$$e_{M2} = e_{M1} \cdot \frac{R_{21}+R_{22}}{R_{22}} \left( \frac{1+CdRdS}{1+\frac{R_{31}+R_{32}}{R_{32}} CdRdS} \right) \quad (14)$$

On the other hand the signal impressed across input terminals $T_7$ and $T_8$ of the second operational amplifier II, for example a positive or negative pulse train set value signal or a pulse width signal $E_{SP}$ supplied from a computor is converted into an analogue set value signal $E_S$ by the operation of a circuit comprising operational amplifier $OA_3$ and a capacitor $C_o$ and the polarity of the signal $E_S$ is then inverted by inverter IN. Operational amplifier $OA_4$ functions to add the output signal $-E_S$ of inverter IN and the measured signal $e_{M1}$. Accordingly, the output signal $\epsilon$ from the second operator section II is expressed as follows:

$$\epsilon = (R_{21}+R_{22})/(R_{22})\,(e_{M1}-E_S) \quad (15)$$

One input terminal of the operational amplifier $OA_1$ of the output section III receives the signal $e_{M2}$ as expressed by equation (13) through capacitor $C_I$ and the signal $\epsilon$ as expressed by equation (15) through resistor $R_I$. Thus, the output voltage from the output section III, or the output voltage $E_o$ of the controller is expressed by following equation (16).

$$Eo = -e_{M2} \cdot \frac{C_I}{C_M} + \frac{1}{2R_I C_M S} \cdot \epsilon$$

$$= -e_{M1} \frac{R_{21}+R_{22}}{R_{22}} \left( \frac{1+CdRdS}{1+\frac{R_{31}+R_{32}}{R_{32}} \cdot CdRdS} \right) + \frac{1}{2R_I C_M S} \cdot \frac{R_{21}+R_{22}}{R_{22}} (e_{M1}-E_S) \quad (16)$$

As equation (15) clearly shows, according to this device the measured signal from the processing system is subjected to the proportional and differentiating operations whereas the difference signal $\epsilon$ between the measured signal $e_{M1}$ and the set value signal $E_S$ is subjected to the integrating operation alone. For this reason, even when the measured signal varies rapidly, output voltage $E_o$ does not vary rapidly.

During the automatic control operation by the so-called cascade setting effected by a pulse shaped reference signal supplied from a computor and the like, capacitor $C_o$ of the second operator section II always stores an analogue signal corresponding to the pulse shaped reference signal $E_{SP}$ from the computor Under these conditions, upon occurrence of a fault of the computor a signal $S_{AL}$ informing the fault will be impressed upon terminal $T_9$ to throw the switch $S_2$ to contact $S_L$. Then the output signal $E_S$ from operational amplifier $OA_3$ rapidly becomes equal to the voltage of the local setter $E_{S1}$, but since such a rapid change provides the output voltage by the action of an integrating circuit comprising resistor $R_I$, capacitor $C_M$ and operational amplifier $OA_1$, so that this output voltage $E_0$ does not vary rapidly.

To provide the manual control operation manual-automatic transfer switch $S_1$ is thrown to contact $S_M$ whereas the manual control switch $S_I$ or $S_D$ of manual setter MC is closed. Again transfer of the operation between the manual control and the automatic control can be effected without bumps.

While the invention has been shown and described in terms of certain preferred embodiments thereof it is to be understood that the invention is not limited to these particular embodiments and that many changes and modifications will occur to one skilled in the art without departing from the true scope and spirit of the invention as defined in the appended claims.

What is claimed is:

1. A controller comprising an input impedance circuit having an input terminal and an output terminal, means to impress upon said input terminal a signal related to a measured signal from a processing system, an operational amplifier to produce an output signal supplied to a load, a transfer switch connected between the output terminal of said input impedance circuit and the input terminal of said operation amplifier, a feedback circuit including a capacitor connected between input and output terminals of said operational amplifier to store a voltage related to said output signal, and a manual setter including means to modify the voltage stored in said capacitor by an external signal, the arrangement being such that at the time of the automatic control operation said transfer switch is operated to connect said output terminal of said input impedance circuit to said input terminal of said operational amplifier whereas at the time of the control operation by said external signal said transfer switch is operated to disconnect said output terminal of said input impedance circuit from said input terminal of said operational amplifier, thus modifying the voltage stored in said capacitor in said feedback circuit by the signal supplied by said manual setter.

2. The controller according to claim 1 wherein said external signal applied to said manual setter comprises a manually generated signal.

3. The controller according to claim 1 wherein said external signal applied to said manual setter comprises a digital signal supplied from a digital computor.

4. The controller according to claim 1 wherein means is provided to apply a pulse signal to the input terminal of said operational amplifier through a resistor at the time of control by said external signal whereby to modify the voltage stored in said capacitor according to said pulse signal.

5. The controller according to claim 1 which further comprises an output transistor to amplify the output signal from said operational amplifier.

6. The controller according to claim 1 wherein said input impedance circuit comprises a capacitor, means to apply to one terminal of said capacitor said signal related to said measured signal from said processing system, a resistor, and means to apply to one end of said resistor a fraction of said signal related to said measured signal.

7. The controller according to claim 1 wherein said signal related to said measured signal and applied upon said input terminal of said input impedance circuit comprises a different signal between said measured signal and a reference signal.

8. The controller according to claim 1 wherein said signal related to said measured signal and applied to said input terminal of said input impedance circuit comprises a difference signal between a signal obtained by differentiating said measured signal and a reference signal.

9. The controller according to claim 1 wherein said signal related to said measured signal and impressed upon the input terminal of said input impedance circuit comprises a signal obtained by differentiating the difference between said measured signal and a reference signal.

10. The controller according to claim 1 which further comprises a pair of diodes connected in parallel opposition between the input terminal of said operational amplifier and a point of common potential.

11. A controller comprising an input impedance circuit having an input terminal, means to impress upon said input terminal a signal related to a measured signal from a processing system, an operational amplifier to produce an output signal supplied to a load, a holding capacitor with one terminal connected to the output terminal of said operational amplifier to store a voltage corresponding to said output signal, a feedback circuit including said holding capacitor and connected between the input and output terminals of said operational amplifier, a transfer switch connected between the output terminal of said input impedance circuit and the input terminal of said operational amplifier, and a manual setter including means to modify the voltage stored in said holding circuit, said transfer switch being operable to connect the output terminal of said input impedance circuit to the input terminal of said operational amplifier and to connect the other end of said holding capacitor to a point of common potential during the automatic control operation, whereas during the controlling operation by an external signal said transfer switch operating to connect the output terminal of said input impedance circuit to said point of common potential and to connect one terminal of said holding capacitor to the input terminal of said operational amplifier.

12. The controller according to claim 1 which further comprises a limiter circuit connected to the output terminal of said operational amplifier, and wherein the upper and lower limit set values of said limiter circuit are variable.

13. The controller according to claim 1 wherein said limiter circuit is provided with means for setting said upper and lower limit values to substantially the same value to manually vary said values in union to adjust the output signal supplied to said load.

14. The controller according to claim 12 wherein said limiter circuit comprises a variable resistor having two sliding brushes, a first transistor rendered ON and OFF in accordance with the relative magnitude between the voltage produced at one brush of said variable resistor and the voltage impressed upon the input terminal of said limiter circuit, a second transistor rendered ON and OFF by said first transistor, and a third transistor rendered ON and OFF in accordance with the relative magnitude between the voltage produced at the other brush and at the input terminal of said limiter circuit.

15. The controller according to claim 12 wherein said limiter circuit comprises a variable resistor having two brushes, a first comparator supplied with the voltage produced at one of said brushes and voltage related to the output voltage supplied to said load, a first diode rendered ON and OFF by the output from said comparator, a second comparator supplied with the voltage produced at the other of said brushes and a voltage related to said output voltage supplied to said load, and a second diode rendered ON and OFF in accordance with the output from said second comparator.

16. The controller according to claim 1 which further comprises a source of supply to energize said operational amplifier and means to shift the voltage levels of the input and output signal of said operational amplifier by a definite voltage.

17. A controller device comprising a primary controller including a first input impedance circuit having an input terminal and an output terminal, means to impress upon said input terminal a signal related to a measured signal from a processing system, a first operational amplifier to produce an output signal a local setter, a cascade-local transfer switch connected between the output terminal of said input impedance circuit and the input terminal of said operational amplifier for switching the operation between the control by cascade setting and the control by said local setter, a feedback capacitor for said operational amplifier connected to store a voltage related to the output voltage from said operational amplifier, said local setter including means to modify the voltage stored in said capacitor; and a second controller comprising a second input impedance circuit including a second capacitor, means to apply to the input terminal of said second input impedance circuit a signal related to the difference between a signal related to a second measured signal from a processing system and the output signal from said primary controller, a second operational amplifier, a second transfer switch interposed between the output terminal of said input impedance circuit and the input terminal of said second operational amplifier, a feedback circuit for said second operational amplifier including a third capacitor to store a voltage related to the output signal supplied to a load from said second operational amplifier and a manual setter including means to modify the voltage stored in said third capacitor in accordance with an external signal, said second controller being connected to utilize said output signal from said first controller as the set value signal.

18. The controller device according to claim 17 wherein said local setter comprises a voltage generator, an operational amplifier and a balancing motor, the arrangement being such that during the control operation by cascade setting, said voltage generator, said operational amplifier and said balancing motor constitute a servo circuit whereas during the control operation by local setting constitute a circuit to send out the voltage generated by said voltage generator.

19. The controller device according to claim 17 wherein said local setter comprises a voltage generator having a local setting controlling means to adjust the voltage generated by said voltage generator.

20. The controller according to claim 1 which further comprises means to apply to the input terminal of said operational amplifier a feed forward signal through a capacitor.

21. A controller comprising an operational circuit connected to receive a measured signal from a processing system for obtaining a deviation signal between said measured signal and a reference signal, a feed forward signal generating circuit to add an external disturbance signal and the output signal from said operational circuit, and at least one output section including an operational amplifier to supply an output signal to a load, a transfer switch provided on the input side of said operational amplifier, a feedback circuit for said operational amplifier to store a voltage related to said output signal, and a manual setter including means to modify the voltage stored in said capacitor in accordance with an external signal, the arrangement being such that during the automatic control operation the output signal of said operational circuit is supplied to the input terminal of said operational amplifier of said output section via a resistor and the output signal from said feed forward signal generating circuit is supplied to the input terminal of said operational amplifier whereas during the controlling operation by said external signal opposite terminals of said resistor and said capacitor are connected to a point of common potential.

22. An automatic selecting controller device comprising at least two controllers, each of said controllers comprising an input impedance circuit connected to receive at its one terminal a signal related to a measured signal from a processing system, an operational amplifier, a transfer switch interposed between the end of said input impedance circuit and the input terminal of said operational amplifier, a feedback capacitor for said operational amplifier, and a manual setter including means to modify the voltage stored in said capacitor in accordance with an external signal; an automatic selector circuit including a diode; means to apply output signals from said at least two controllers whereby to supply an output signal corresponding to a larger or smaller one of said output signals to a load; and means to store a voltage related to said output signal supplied to said load in said feedback capacitor.

23. The automatic selecting controlling device according to claim 22 wherein said automatic selector circuit includes a transistor with its emitter electrode connected to a source of supply.

24. The automatic selecting controlling device according to claim 22 wherein said automatic selector circuit includes a transistor with its collector electrode connected to a source of supply.

25. A controller device comprising at least two controllers, each of said adjusters including an input impedance connected to receive at its input terminal a signal related to a measured signal from a processing system, an operational amplifier, a transfer switch disposed between the output terminal of said input impedance circuit and the input terminal of said operational amplifier, a feedback capacitor for said operational amplifier, and a manual setter including means to modify the voltage stored in said capacitor; a load; a second transfer switch to selectively supply the outputs from said at least two controllers to said load; and means to store in said feedback capacitor a voltage related to the output signal supplied to said load.

26. A controller comprising at least two operator sections to determine the difference between a measured signal from a processing system and a reference signal, at least two input impedance circuits each including a capacitor and connected to receive at its one terminal a signal related to the output signal from one of said operator sections, an operational amplifier, a transfer switch interposed between the other terminals of said input impedance circuits and the input terminal of said operational amplifier, a feedback capacitor for said operational amplifier to store a voltage related to the output signal supplied to a load from said operational amplifier, and a manual setter including means to modify the voltage stored in said feedback capacitor in accordance with an external signal, the arrangement being such that during the automatic control operation said transfer switch operates to connect the output terminal of either one of said at least two input impedance circuits to the input terminal of said operational amplifier whereas during the manual control operation said transfer switch operates to connect the output terminals of said input impedance circuits to a point of common potential.

27. A controller comprising a first operator section connected to receive a measured signal from a processing system to subject said measured signal at least to a proportionality gain operation, a second operator section to determine the difference between a reference signal and said measured signal, an operational amplifier to supply an output signal to a load, a transfer switch connected to the input terminal of said operational amplifier, a feedback capacitor for said operational amplifier to store a voltage related to said output signal, and a manual setter including to modify the voltage stored in said feedback capacitor in accordance with said external signal, the arrangement being such that said transfer switch operates to apply the output voltage from said first operator section to the input terminal of said operational amplifier during the automatic control operation whereas during the control operation by said external signal said transfer switch operates to connect the output terminal of said first operator section to a point of common potential through a capacitor.

* * * * *

PO-1050
(5/69)

UNITED STATES PATENT OFFICE
CERTIFICATE OF CORRECTION

Patent No. 3,655,992 Dated April 11, 1972

-1-

Inventor(s) Isamu Ohno et al

It is certified that error appears in the above-identified patent and that said Letters Patent are hereby corrected as shown below:

In Figure 6 - the junction between the line connecting capacitor $Cf_1$ and contact SM·SD with the line connecting contact $S_A$ and impedance circuit I.I should be indicated.

In Figure 11 - the line from the collector of transistor Tr1 to the base of transistor Tr2 should not be indicated as being connected to the line between diode $D_3$ and the emitter of transistor Tr2.

In Figure 16 - reference numeral "Si" designating the contact at the input of operational amplifier $OA_1$ should be --SL--.

In Figure 18 - reference numeral "CI" designating the capacitor connected at the output of operational amplifier $OA_3$ should be --$C_{I1}$--.

PO-1050
(5/69)

UNITED STATES PATENT OFFICE
CERTIFICATE OF CORRECTION

Patent No. 3,655,992 Dated April 11, 1972

- 2 -

Inventor(s) Isamu Ohno et al

It is certified that error appears in the above-identified patent and that said Letters Patent are hereby corrected as shown below:

In Figure 18 - reference numeral "$R_{21}$" should be indicated as referring to that portion of the potentiometer not referred to by $R_{22}$.

In Figure 22 - the junction between the line containing resistor r and the line connecting contact $S_{31}$ with the capacitor $C_{M1}$ should be indicated.

PO-1050
(5/69)

UNITED STATES PATENT OFFICE
CERTIFICATE OF CORRECTION

Patent No. 3,655,992 Dated April 11, 1972

Inventor(s) Isamu Ohno et al - 3 -

It is certified that error appears in the above-identified patent and that said Letters Patent are hereby corrected as shown below:

Col. 4, lines 4-5, "adjustment" should read --control--.

Col. 5, line 10, "FIG. 5" should read --FIG. 4--.

Col. 6, lines 3-6, "across the input terminal of the operational amplifier OA and the ground can assure normal operation of the operational amplifier even when the output thereof becomes saturated" should read --limits the amount of charge the capacitor CM can get--.

Col. 11, lines 31-32, "of the transfer switch $S_3$" should be deleted.

Col. 13, line 75, "$C_1$" should read --$C_{I1}$--.

Col. 14, line 23, "$C_1$" should read --$C_{I1}$--.

Col. 14, the equation between lines 25 and 30 should read $$--Eo=-Em_1 \cdot \frac{1}{C_M R_{I1} S} \cdot EM_2 \frac{C_1}{C_M}--.$$

PO-1050
(5/69)

UNITED STATES PATENT OFFICE
CERTIFICATE OF CORRECTION

Patent No. 3,655,992 Dated April 11, 1972

4 -

Inventor(s) Isamu Ohno et al

It is certified that error appears in the above-identified patent and that said Letters Patent are hereby corrected as shown below:

Col. 14, equation (11) between lines 35 and 40 should read

-- $=n\cdot\frac{C_{I1}}{C_M}(1+\frac{1}{C_I\cdot R_{I1}})(eM1-E_{S1})+\frac{C_{I1}}{C_M}\cdot eM2+\frac{C_{I1}}{C_M}\cdot eM2$ --.

Col. 14, line 44, "$C_{I1}R_I$" should read -- $C_{I1}R_{I1}$--.

Col. 15, line 74, "adjuster" should read --controller--.

Col. 16, equation (12) should read

-- $Eo=(eM1-E_{S1})\frac{R_{21}+R_{22}}{R_{22}}\cdot\frac{C_1}{C_{M1}}(1+\frac{1}{C_1R_1S})$ --.

Col. 16, line 70 "$C_{M1}$" should read --$C_1$--.

Col. 17, line 21, "$OA_3$" should read --$OA_1$--.

In Figure 5 - "DEGITAL" should read --DIGITAL--.

Signed and sealed this 6th day of February 1973.

(SEAL)
Attest:

EDWARD M.FLETCHER,JR.
Attesting Officer

ROBERT GOTTSCHALK
Commissioner of Patents